United States Patent
Yamada et al.

(10) Patent No.: US 9,843,924 B2
(45) Date of Patent: Dec. 12, 2017

(54) DEVICES FOR ESTABLISHING MULTIPLE CONNECTIONS

(71) Applicant: Sharp Kabushiki Kaisha, Osaka-shi, Osaka (JP)

(72) Inventors: Shohei Yamada, Osaka (JP); Ahmad Khoshnevis, Portland, OR (US); Zhanping Yin, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/825,862

(22) Filed: Aug. 13, 2015

(65) Prior Publication Data

US 2015/0350883 A1  Dec. 3, 2015

Related U.S. Application Data

(63) Continuation of application No. 13/744,403, filed on Jan. 17, 2013, now Pat. No. 9,144,091.

(51) Int. Cl.
| | |
|---|---|
| *H04W 4/00* | (2009.01) |
| *H04W 8/20* | (2009.01) |
| *H04W 72/04* | (2009.01) |
| *H04W 8/14* | (2009.01) |
| *H04W 76/00* | (2009.01) |
| *H04W 76/02* | (2009.01) |
| *H04W 72/00* | (2009.01) |
| *H04W 88/08* | (2009.01) |
| *H04W 92/10* | (2009.01) |
| *H04W 80/02* | (2009.01) |

(52) U.S. Cl.
CPC ............ *H04W 8/205* (2013.01); *H04W 8/14* (2013.01); *H04W 72/04* (2013.01); *H04W 72/044* (2013.01); *H04W 76/00* (2013.01); *H04W 76/025* (2013.01); *H04W 72/00* (2013.01); *H04W 80/02* (2013.01); *H04W 88/085* (2013.01); *H04W 92/10* (2013.01)

(58) Field of Classification Search
CPC ......... H04W 8/20; H04W 8/14; H04W 8/205; H04W 72/044; H04W 76/00; H04W 76/025; H04W 72/04
USPC ........................................................ 370/338
See application file for complete search history.

(56) References Cited

U.S. PATENT DOCUMENTS

2009/0109933 A1* 4/2009 Murasawa ............ H04L 63/029
 370/335
2009/0280839 A1 11/2009 Farnsworth et al.
(Continued)

OTHER PUBLICATIONS

3GPP TS 36.331 V11.2.0, Evolved Universal Terrestrial Radio Access (E-UTRA); Radio Resource Control(RRC); Protocol specification (Release 11), Dec. 2012.

(Continued)

*Primary Examiner* — Sai-Ming Chan
(74) *Attorney, Agent, or Firm* — Austin Rapp

(57) ABSTRACT

A method by a User Equipment (UE) is described. The method includes establishing a first radio interface between the UE and a first point on an Evolved Universal Terrestrial Radio Access Network (E-UTRAN). The method also includes establishing a second radio interface between the UE and a second point on the E-UTRAN by using the first radio interface. The method further includes mapping data radio bearers (DRBs) to at least one of the first radio interface and the second radio interface.

4 Claims, 21 Drawing Sheets

(56) References Cited

U.S. PATENT DOCUMENTS

| | | | |
|---|---|---|---|
| 2010/0067604 A1* | 3/2010 | Bhadra | H04B 7/024 375/267 |
| 2010/0075679 A1 | 3/2010 | Tenny et al. | |
| 2012/0157089 A1* | 6/2012 | Yang | H04L 12/2464 455/424 |
| 2013/0021929 A1* | 1/2013 | Kim | H04B 7/024 370/252 |
| 2014/0003333 A1* | 1/2014 | Ivershen | H04W 24/08 370/328 |
| 2014/0003348 A1 | 1/2014 | Velev et al. | |
| 2014/0056243 A1* | 2/2014 | Pelletier | H04W 74/04 370/329 |
| 2014/0349694 A1* | 11/2014 | Raghothaman | H04W 36/00 455/509 |
| 2015/0011158 A1* | 1/2015 | Luo | H04W 16/26 455/11.1 |

OTHER PUBLICATIONS

3GPP TS 36.300 V11.4.0, Evolved Universal Terrestrial Radio Access (E-UTRA) and Evolved Universal Terrestrial Radio Access Network (E-UTRAN); Overall description; Stage 2 (Release 11), Dec. 2012.

NTT DoCoMo, Inc., "Requirements, Candidate Solutions & Technology Roadmap for LTE Rel-12 Onward," 3GPP Workshop on Release 12 and onwards, RWS-120010, Ljubljana, Slovenia, Jun. 2012.

NEC, "Consideration of the Possible Structures on the Dual Connectivity" 3GPP TSG-RAN WG3 Meeting #79, R3-130138, Feb. 2013.

3GPP TS 36.300 V8.5.0, Evolved Universal Terrestrial Radio Access (E-UTRA) and Evolved Universal Terrestrial Radio Access Network (E-UTRAN), (Release 8), May 2008.

China Mobile (Rapporteur), "Draft TR 36.932 Ver. 1.0.0 Scenarios and Requirements for Small Cell Enhancements for E-UTRA and E-UTRAN (Release 12) for Information and Approval," 3GPP TSG RAN Meeting #58, RP-121468, Dec. 2012.

NTT DoCoMo, Inc, "New Study Item Description: Small Cell enhancements for E-UTRA and E-UTRAN Higher-layer Aspects," 3GPP TSG-RAN Meeting #58, RP-122033, Dec. 2012.

Office Action issued for U.S. Appl. No. 13/744,403 dated Jun. 12, 2014.

Office Action issued for U.S. Appl. No. 13/744,403 dated Dec. 3, 2014.

Notice of Allowance issued for U.S. Appl. No. 13/744,403 dated May 19, 2015.

* cited by examiner

DEVICES FOR ESTABLISHING MULTIPLE CONNECTIONS

RELATED APPLICATIONS

This application is a continuation of U.S. patent application Ser. No. 13/744,403 entitled "DEVICES FOR ESTABLISHING MULTIPLE CONNECTIONS," filed Jan. 17, 2013, which is hereby incorporated by reference in its entirety.

TECHNICAL FIELD

The present disclosure relates generally to communication systems. More specifically, the present disclosure relates to devices for establishing multiple connections.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and efficiency have been sought. However, improving communication capacity, speed, flexibility and efficiency may present certain problems.

For example, wireless communication devices may communicate with one or more devices using a communication structure. However, the communication structure used may only offer limited flexibility and efficiency. As illustrated by this discussion, systems and methods that improve communication flexibility and efficiency may be beneficial.

DETAILED DESCRIPTION

Figure 1:
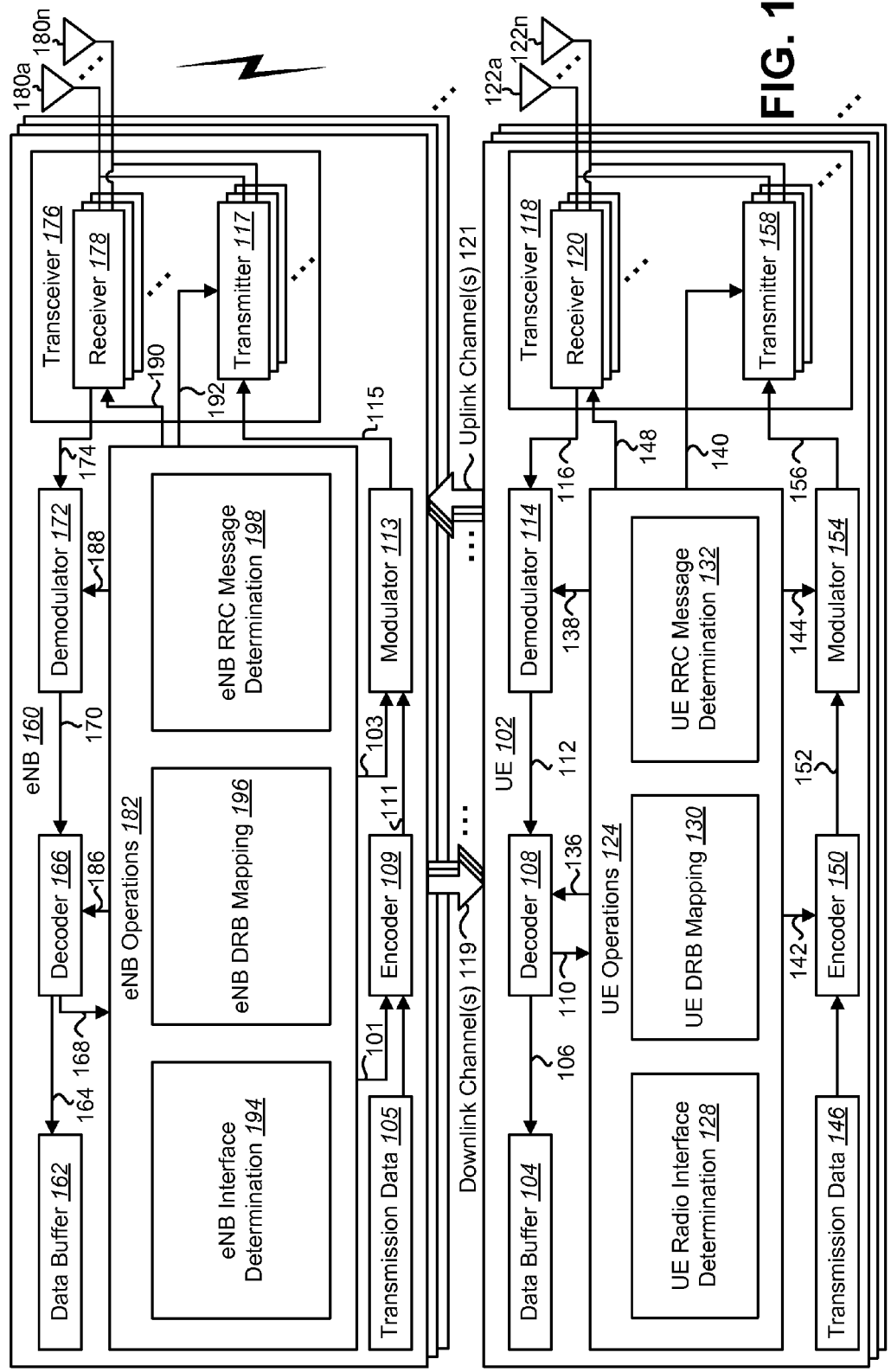
FIG. 1 is a block diagram illustrating one configuration of one or more evolved Node Bs (eNBs) and one or more user equipments (UEs) in which systems and methods for establishing multiple connections may be implemented.

A method by a UE is described. The method includes establishing a first radio interface between the UE and a first point on an E-UTRAN. The method also includes establishing a second radio interface between the UE and a second point on the E-UTRAN by using the first radio interface. The method further includes mapping data radio bearers (DRBs) to at least one of the first radio interface and the second radio interface.

All DRBs may be mapped to one radio interface. A first DRB set may be mapped to the first radio interface and a second DRB set may be mapped to the second radio interface.

One or more RRC messages sent or received by the UE may terminate at one of the first point or the second point. At least one RRC message sent or received by the UE may terminate at the first point and at least one RRC message may terminate at the second point.

The first point may be connected to a mobility management entity (MME) and the second point may be connected to one or more of a serving gateway (S-GW) and a proxy gateway between the second point and the S-GW. The first point may be a termination for a user plane protocol and the second point may be a termination for a control plane protocol.

The first point may be connected to a MME and to an S-GW. The first point may be a termination for a user plane protocol and may be a termination for a control plane protocol.

A method by a first eNB is also described. The method includes connecting to a UE with a first radio interface. The method also includes connecting to a second eNB. The UE is connected to the second eNB with a second radio interface. The method further includes mapping DRBs to at least one of the first radio interface and the second radio interface.

A UE is also described. The UE includes a processor and memory in electronic communication with the processor. The UE also includes instructions stored in the memory. The instructions are executable to establish a first radio interface between the UE and a first point on an E-UTRAN. The instructions are also executable to establish a second radio interface between the UE and a second point on the E-UTRAN by using the first radio interface. The instructions are further executable to map DRBs to at least one of the first radio interface and the second radio interface.

An eNB is also described. The eNB includes a processor and memory in electronic communication with the processor. The eNB also includes instructions stored in the memory. The instructions are executable to connect to a UE with a first radio interface. The instructions are also executable to connect to a second eNB. The UE is connected to the second eNB with a second radio interface. The instructions are further executable to map DRBs to at least one of the first radio interface and the second radio interface.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe devices for establishing multiple connections. This may be done in the context of an evolved universal terrestrial radio access network (E-UTRAN). For example, establishing multiple connections between a user equipment (UE) and two or more eNBs on an E-UTRAN is described. In one configuration, the two or more eNBs may have different schedulers.

The systems and methods described herein may enhance carrier aggregation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single eNB is assumed to provide multiple serving cells for a UE. Even in scenarios where two or more cells may be aggregated (e.g., a macro cell aggregated with remote radio head (RRH) cells) the cells may be controlled (e.g., scheduled) by a single eNB. However, in a small cell deployment scenario, each node (e.g., eNB, RRH, etc.) may have its own independent scheduler. To maximize the efficiency of radio resources utilization of both nodes, a UE may connect to two or more nodes that have different schedulers.

In one configuration, for a UE to connect to two nodes (e.g., eNBs) that have different schedulers, multi-connectivity between the UE and E-UTRAN may be utilized. For example, in addition to Rel-11 operation, a UE operating according to the Rel-12 standard may be configured with multi-connectivity (which may also be referred to as dual connectivity, inter-eNB carrier aggregation, multi-flow, multi-cell cluster, multi-Uu, etc.). The UE may connect to the E-UTRAN with multiple Uu interfaces, if configured. For instance, the UE may be configured to establish one or more additional radio interfaces by using one radio interface. Hereafter, one node is called as primary eNB (PeNB) and another node is called as secondary eNB (SeNB).

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more evolved Node Bs (eNBs) 160 and one or more user equipments (UEs) 102 in which systems and methods for establishing multiple connections may be implemented. The one or more UEs 102 may communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n. It should be noted that one or more of the UEs described herein may be implemented in a signal device in some configurations. For example, multiple UEs may be combined into a single device in some implementations. Additionally or alternatively, one or more of the eNBs described herein may be implemented in a single device in some configurations. For example, multiple eNBs may be combined into a single device in some implementations. In the context of FIG. 1, for instance, a single device may include one or more UEs 102 in accordance with the systems and methods described herein. Additionally or alternatively, one or more eNBs 160 in accordance with the systems and methods described herein may be implemented as a single device or multiple devices.

The UE 102 and the eNB 160 may use one or more channels 119, 121 to communicate with each other. For example, a UE 102 may transmit information or data to the eNB 160 using one or more uplink channels 121. Examples of uplink channels 121 include a physical uplink control channel (PUCCH) and a physical uplink shared channel (PUSCH), etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the eNB operations module 182 may be implemented in hardware, software or a combination of both.

In general, the UE operations module 124 may enable the UE 102 to communicate with the one or more eNBs 160. The UE operations module 124 may include one or more of a UE radio interface determination module 128, a UE data radio bearer (DRB) mapping module 130 and a UE radio resource control (RRC) message determination module 132.

The UE radio interface determination module 128 may establish a first radio interface between the UE 102 and a first point on an Evolved Universal Terrestrial Radio Access Network (E-UTRAN). For example, the first point may include a first eNB 160 belonging to an E-UTRAN. In one configuration, the first eNB 160 may be referred to as a primary eNB (PeNB). The UE radio interface determination module 128 may connect to the first point (e.g., eNB 160) with a Uu interface. The Uu interface may also be referred to as a primary Uu interface. The Uu interface may be a radio interface between the UE 102 and the first eNB 160.

The UE 102 may be configured to establish a second radio interface between the UE 102 and a second point on the E-UTRAN (e.g., second eNB 160) by using the first radio interface. In one configuration, the UE 102 may be configured by the first eNB 160 to connect to the E-UTRAN with multiple radio interfaces. Therefore, upon connecting with the first eNB 160, the eNB 160 may configure the UE 102 to establish additional radio interfaces using the first radio interface. The UE radio interface determination module 128 may connect to the second eNB 160 using the second radio interface. The second eNB 160 may be referred to as a secondary eNB (SeNB). In one configuration, the PeNB and the SeNB have different schedulers. The UE radio interface determination module 128 may connect to the second eNB 160 with a Uux interface. The Uux interface may also be referred to as a secondary Uu interface.

The UE 102 may not be required to be aware of the PeNB and SeNB as long as the UE 102 is aware of the multiple Uu interfaces with the E-UTRAN. In one configuration, the UE 102 may see an eNB 160 as a point on the E-UTRAN. In another configuration, the UE 102 may see the multiple Uu interfaces with the E-UTRAN as connections with multiple points on the E-UTRAN. In yet another configuration, the E-UTRAN may provide multiple Uu interfaces with the same or different eNBs 160. For instance, the PeNB and SeNB could be the same eNB 160. The multiple Uu interfaces (e.g., multi-connectivity) may be achieved even by a single eNB 160. In other words, in one configuration, the systems and methods described herein may be achieved by a single eNB 160 or a single scheduler. The UE 102 may be able to connect more than one Uux interface (e.g., Uu1, Uu2, Uu3, etc.). Each Uu interface may be used to perform carrier aggregation (CA). Therefore, the UE 102 may be configured with more than one set of serving cells in a CA scenario.

It should be noted that while multiple Uu interfaces are described, the systems and methods described herein may be realized by a single Uu interface or a single radio interface depending on the definition of interface. For example, a radio interface may be defined as an interface between the UE 102 and the E-UTRAN. In this definition, the interface is not an interface between the UE 102 and an eNB 160. For example, one radio interface can be defined as an interface between UE 102 and the E-UTRAN with multi-connectivity. Therefore, the Uu interface and Uux interface discussed above may be considered as different characteristics of cells. For instance, the Uu interface may be a first set of cell(s) and the Uux interface may be a second set of cell(s). Also, the first radio interface may be rephrased as a first set of cell(s) and the second radio interface may be rephrased as a second set of cell(s).

The UE DRB mapping module 130 may map DRBs to at least one of the first radio interface and the second radio interface. A DRB (Data Radio Bearer) is a radio bearer that carries user data (as opposed to control plane signaling). For example, a DRB may be mapped to the user plane protocol stack. The user plane protocol stack may include packet data convergence protocol (PDCP), radio link control (RLC), medium access control (MAC) and physical (PHY) layers. For instance, when a DRB is established by RRC signaling from the eNB 160 to the UE 102, a PDCP entity, an RLC entity (or entities), and a Dedicated Traffic Channel (DTCH) logical channel may be established. For each DRB, a PDCP entity, an RLC entity (or entities), and a DTCH logical channel are established. For one radio interface, DRBs may use a MAC entity and a PHY entity. DRB configurations (e.g., DRB addition, modification and release) may include PDCP configuration, RLC configuration and/or logical channel configuration.

In one configuration, all DRBs (e.g., DRB1, DRB2, DRB3 . . . ) may be mapped to one radio interface. For example, the user plane may use only the Uux interface. Therefore, all DRBs may be mapped to the Uux interface. In another configuration, the DRBs may be organized into DRB sets that may be mapped to different radio interfaces. For example, a first DRB set (e.g., DRB1, DRB2, DRB3 . . . ) may be mapped to the first radio interface (e.g., the Uu interface) and a second DRB set (e.g., DRB4, DRB5, DRB6 . . . ) may be mapped to the second radio interface (e.g., the Uux interface). The DRB mapping is discussed in more detail in FIG. 12 and FIG. 13.

The UE RRC message determination module 132 may send or receive one or more RRC messages. The RRC protocol may convey control plane signaling, through which the E-UTRAN may control the behavior of the UE 102. For multi-connectivity operation (e.g., multiple Uu interface operation), the UE 102 may have one RRC connection, may have multiple RRC connections or may have one RRC connection and multiple sub-RRC connections. In one configuration, the one or more RRC messages sent by the UE RRC message determination module 132 may terminate at a single point on the E-UTRAN. For example, the UE RRC message determination module 132 may send RRC messages toward (or receive RRC messages from) a single point on the E-UTRAN. Therefore, the one or more RRC messages may terminate at one of the first eNB 160 or the second eNB 160.

In another configuration, the one or more RRC messages may terminate at multiple points on the E-UTRAN. For example, the UE 102 may send RRC messages toward (or receive RRC messages from) multiple addressed points on the E-UTRAN. Therefore, at least one RRC message may terminate at the first eNB 160 and at least one RRC message may terminate at the second eNB 160. Multiple scenarios for conveying RRC messages are discussed in more detail in FIG. 14 through FIG. 17.

The UE operations module 124 may provide information 148 to the one or more receivers 120. For example, the UE operations module 124 may inform the receiver(s) 120 when or when not to receive transmissions based on the uplink grant.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include the DRBs and the RRC messages.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PUSCH transmission data) that may be used by the eNB operations module 182 to perform one or more operations.

In general, the eNB operations module 182 may enable the eNB 160 to communicate with the one or more UEs 102. The eNB operations module 182 may include one or more of an eNB interface determination module 194, an eNB DRB mapping module 196 and an eNB RRC message determination module 198.

The eNB interface determination module 194 may connect to a UE 102 with a first radio interface. For example, a first eNB 160 may belong to an E-UTRAN. In one configuration, the first eNB 160 may be referred to as a primary eNB (PeNB). The eNB interface determination module 194 may connect to the UE 102 with a Uu interface as described above.

The eNB interface determination module 194 may determine whether the UE 102 may be configured to connect to a second eNB 160 with a second radio interface. In one configuration, the eNB interface determination module 194 may configure the UE 102 to connect to the E-UTRAN with multiple radio interfaces. Therefore, upon connecting with the UE 102 (using the first radio interface), the eNB interface determination module 194 may configure the UE 102 to establish additional radio interfaces.

The eNB interface determination module 194 may connect to a second eNB 160. For example, upon being configured for multi-connectivity (using the first radio interface), the UE 102 may connect to the second eNB 160 with a second radio interface (e.g., Uux interface). The second eNB 160 may be referred to as a secondary eNB (SeNB). The eNB interface determination module 194 may connect to the second eNB 160 to facilitate multi-connectivity and carrier aggregation. The eNB interface determination module 194 may connect to the second eNB 160 using one or more X interfaces. The first eNB 160 and the second eNB 160 may exchange data (e.g., DRBs and RRC messages) across the one or more X interfaces. In one configuration, the first eNB 160 and the second eNB 160 have different schedulers.

The eNB DRB mapping module 196 may map DRBs to at least one of the first radio interface and the second radio interface. In one configuration, all DRBs may be mapped to one radio interface. For example, the user plane may use only the Uux interface. Therefore, all DRBs may be mapped to the Uux interface. In another configuration, the DRBs may be organized into DRB sets that may be mapped to different radio interfaces. For example, a first DRB set may be mapped to the first radio interface (e.g., the Uu interface) and a second DRB set may be mapped to the second radio interface (e.g., the Uux interface). The DRB mapping is discussed in more detail in FIG. 12 and FIG. 13.

The eNB RRC message determination module 198 may send or receive one or more RRC messages. The RRC protocol may convey control plane signaling, through which the E-UTRAN may control the behavior of the UE 102. For multi-connectivity operation (e.g., multiple Uu interface operation), the UE 102 may have one RRC connection, may have multiple RRC connections or may have one RRC connection and multiple sub-RRC connections. In one configuration, the one or more RRC messages sent or received by the eNB RRC message determination module 198 may terminate at a single point on the E-UTRAN. For example, the eNB RRC message determination module 198 may receive all RRC messages sent by the UE 102. Therefore, each of the one or more RRC messages may terminate at the first eNB 160.

In another configuration, the one or more RRC messages may terminate at multiple points on the E-UTRAN. For example, the UE 102 may send RRC messages toward multiple addressed points on the E-UTRAN. The eNB RRC message determination module 198 may determine whether an RRC message terminates at the first eNB 160 or at the second eNB 160 based on the address included with an RRC message. Therefore, at least one RRC message may terminate at the first eNB 160 and at least one RRC message may terminate at the second eNB 160. Multiple scenarios for conveying RRC messages are discussed in more detail in FIG. 14 through FIG. 17.

The eNB operations module 182 may provide information 190 to the one or more receivers 178. For example, the eNB operations module 182 may inform the receiver(s) 178 when or when not to receive transmissions based on the DRBs and the RRC messages.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101. The other information 101 may include the DRBs and the RRC messages.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
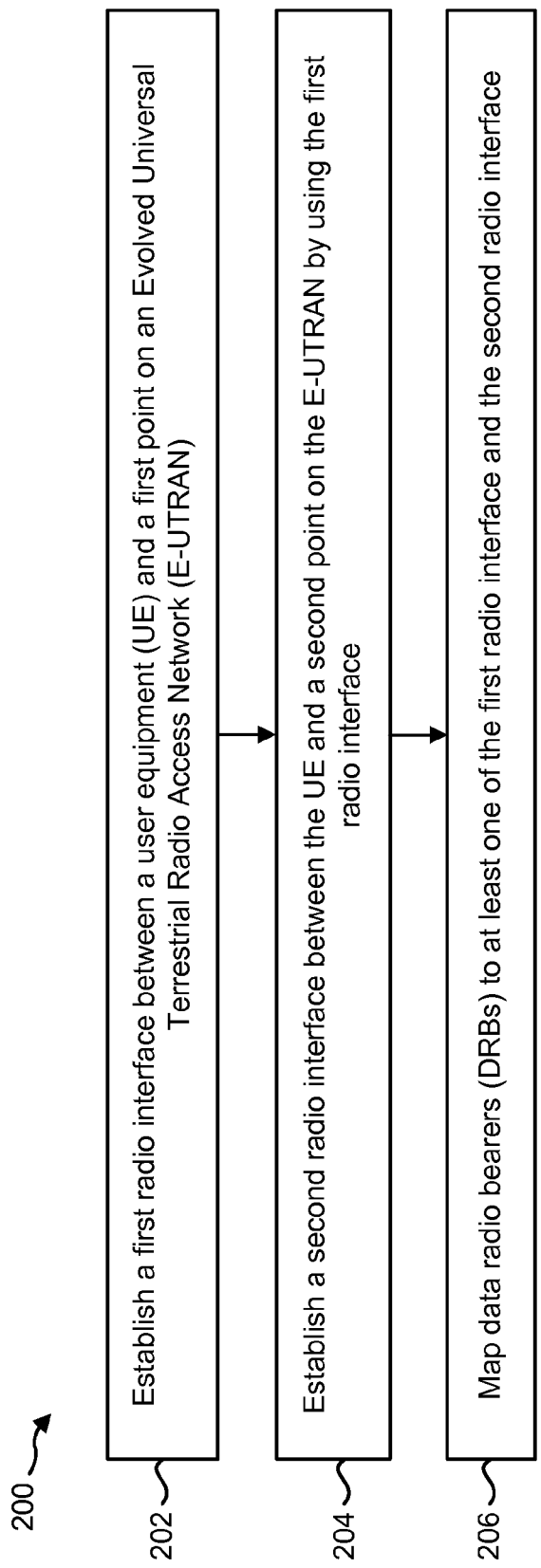
FIG. 2 is a flow diagram illustrating one implementation of a method for establishing multiple connections by a UE.

FIG. 2 is a flow diagram illustrating one implementation of a method 200 for establishing multiple connections by a UE 102. The UE 102 may establish 202 a first radio interface between the UE 102 and a first point (e.g., first eNB 160) on an E-UTRAN. For example, the first eNB 160 may belong to an E-UTRAN. In one configuration, the first eNB 160 may be referred to as a primary eNB (PeNB). The UE 102 may connect 202 to the first eNB 160 with a Uu interface. The Uu interface may also be referred to as a primary Uu interface. The Uu interface may be a radio interface between the UE 102 and the first eNB 160.

The UE 102 may establish 204 a second radio interface between the UE 102 and a second point (e.g., second eNB 160) on the E-UTRAN by using the first radio interface. In one configuration, the UE 102 may be configured by the first eNB 160 to connect to the E-UTRAN with multiple radio interfaces. Therefore, upon connecting with the first eNB 160, the eNB 160 may configure the UE 102 to establish additional radio interfaces using the first radio interface. The UE 102 may connect to the second eNB 160 using the second radio interface. The second eNB 160 may be referred to as a secondary eNB (SeNB). In one configuration, the first eNB 160 and the second eNB 160 have different schedulers. The UE 102 may connect to the second eNB 160 with a Uux interface. The Uux interface may also be referred to as a secondary Uu interface.

The UE 102 may map 206 DRBs to at least one of the first radio interface and the second radio interface. In one configuration, all DRBs may be mapped 206 to one radio interface. For example, the user plane may use only the Uux interface. Therefore, all DRBs may be mapped 206 to the Uux interface. Alternatively, all DRBs may be mapped 206 to the Uu interface.

In another configuration, the DRBs may be organized into DRB sets that may be mapped 206 to different radio interfaces. For example, a first DRB set may be mapped 206 to the first radio interface (e.g., the Uu interface) and a second DRB may be mapped 206 to the second radio interface (e.g., the Uux interface).

In some configurations, the UE 102 may also send one or more RRC messages. The RRC protocol may convey control plane signaling, through which the E-UTRAN may control the behavior of the UE 102. For multi-connectivity operation (e.g., multiple Uu interface operation), the UE 102 may have one RRC connection, may have multiple RRC connections or may have one RRC connection and multiple sub-RRC connections. In one configuration, the one or more RRC messages sent by the UE 102 may terminate at a single point on the E-UTRAN. For example, the UE 102 may send RRC messages toward a single point on the E-UTRAN. Therefore, the one or more RRC messages may terminate at one of the first eNB 160 or the second eNB 160.

In other configurations, the one or more RRC messages may terminate at multiple points on the E-UTRAN. For example, the UE 102 may send RRC messages toward multiple addressed points on the E-UTRAN. Therefore, at least one RRC message may terminate at the first eNB 160 and at least one RRC message may terminate at the second eNB 160.

Figure 3:
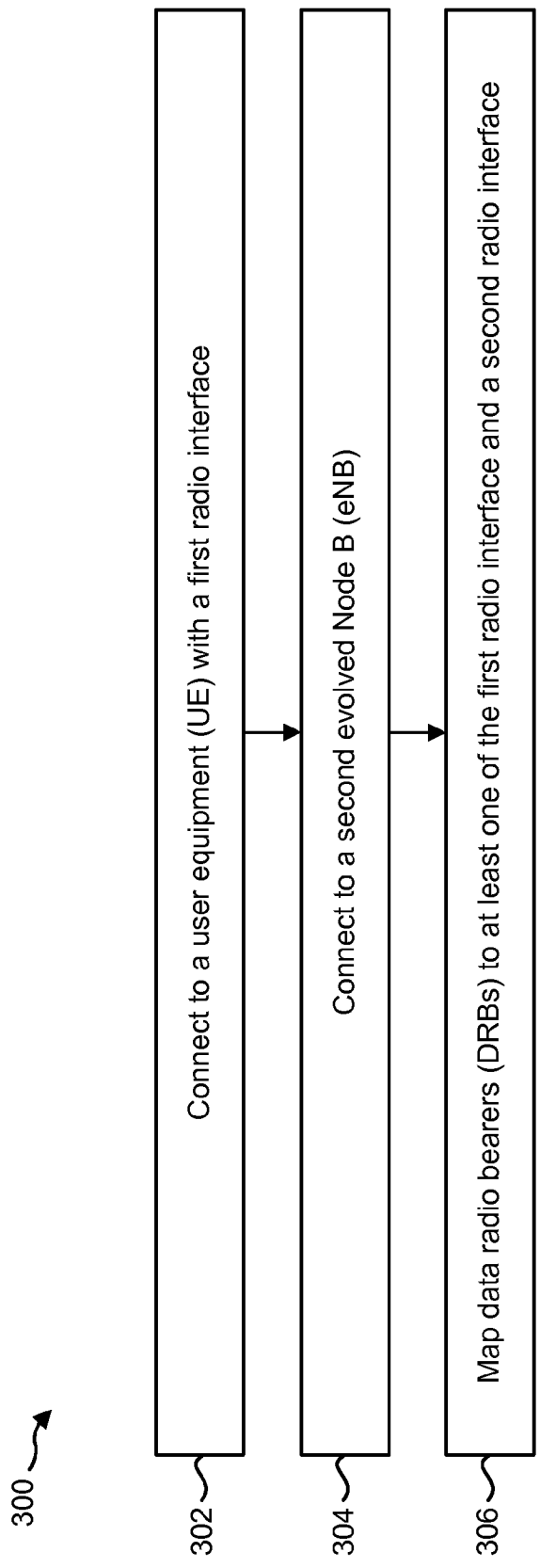
FIG. 3 is a flow diagram illustrating one implementation of a method for establishing multiple connections by a first eNB.

FIG. 3 is a flow diagram illustrating one implementation of a method 300 for establishing multiple connections by a first eNB 160. The first eNB 160 may be similar to the eNB 160 described above in connection with FIG. 1. The first eNB 160 may connect 302 to a UE 102 with a first radio interface. For example, the first eNB 160 may belong to an E-UTRAN. In one configuration, the first eNB 160 may be referred to as a primary eNB (PeNB). The first eNB 160 may connect 302 to the UE 102 with a Uu interface as described above in connection with FIG. 1. The first eNB 160 may determine whether the UE 102 may be configured to connect to a second eNB 160 with a second radio interface. In one configuration, the first eNB 160 may configure the UE 102 to connect to the E-UTRAN with multiple radio interfaces. Therefore, upon connecting 302 with the UE 102 (using the first radio interface), the first eNB 160 may configure the UE 102 to establish additional radio interfaces.

The first eNB 160 may connect 304 to a second eNB 160. For example, upon being configured for multi-connectivity (using the first radio interface), the UE 102 may connect to the second eNB 160 with a second radio interface (e.g., Uux interface). The second eNB 160 may be referred to as a secondary eNB (SeNB). The first eNB 160 may connect 304 to the second eNB 160 to facilitate multi-connectivity and carrier aggregation. The first eNB 160 may connect 304 to the second eNB 160 using one or more X interfaces. The first eNB 160 and the second eNB 160 may exchange data (e.g., DRBs and RRC messages) across the one or more X interfaces. In one configuration, the first eNB 160 and the second eNB 160 have different schedulers.

The first eNB 160 may map 306 DRBs to at least one of the first radio interface and the second radio interface. In one configuration, all DRBs may be mapped 306 to one radio interface. For example, the user plane may use only the Uux interface. Therefore, all DRBs may be mapped 306 to the Uux interface. Alternatively, all DRBs may be mapped 306 to the Uu interface.

In another configuration, the DRBs may be organized into DRB sets that may be mapped 306 to different radio interfaces. For example, a first DRB set may be mapped 306 to the first radio interface (e.g., the Uu interface) and a second DRB set may be mapped 306 to the second radio interface (e.g., the Uux interface).

In some configurations, the first eNB 160 may also receive one or more RRC messages. The RRC protocol may convey control plane signaling, through which the E-UTRAN may control the behavior of the UE 102. For multi-connectivity operation (e.g., multiple Uu interface operation), the UE 102 may have one RRC connection, may have multiple RRC connections or may have one RRC connection and multiple sub-RRC connections. In one configuration, the one or more RRC messages received by the first eNB 160 may terminate at a single point on the E-UTRAN. For example, the first eNB 160 may receive all RRC messages sent by the UE 102. Therefore, each of the one or more RRC messages may terminate at the first eNB 160.

In other configurations, the one or more RRC messages may terminate at multiple points on the E-UTRAN. For example, the UE 102 may send RRC messages toward multiple addressed points on the E-UTRAN. The first eNB 160 may determine whether an RRC message terminates at the first eNB 160 or at the second eNB 160 based on an address included with an RRC message. Therefore, at least one RRC message may terminate at the first eNB 160 and at least one RRC message may terminate at the second eNB 160.

Figure 4:
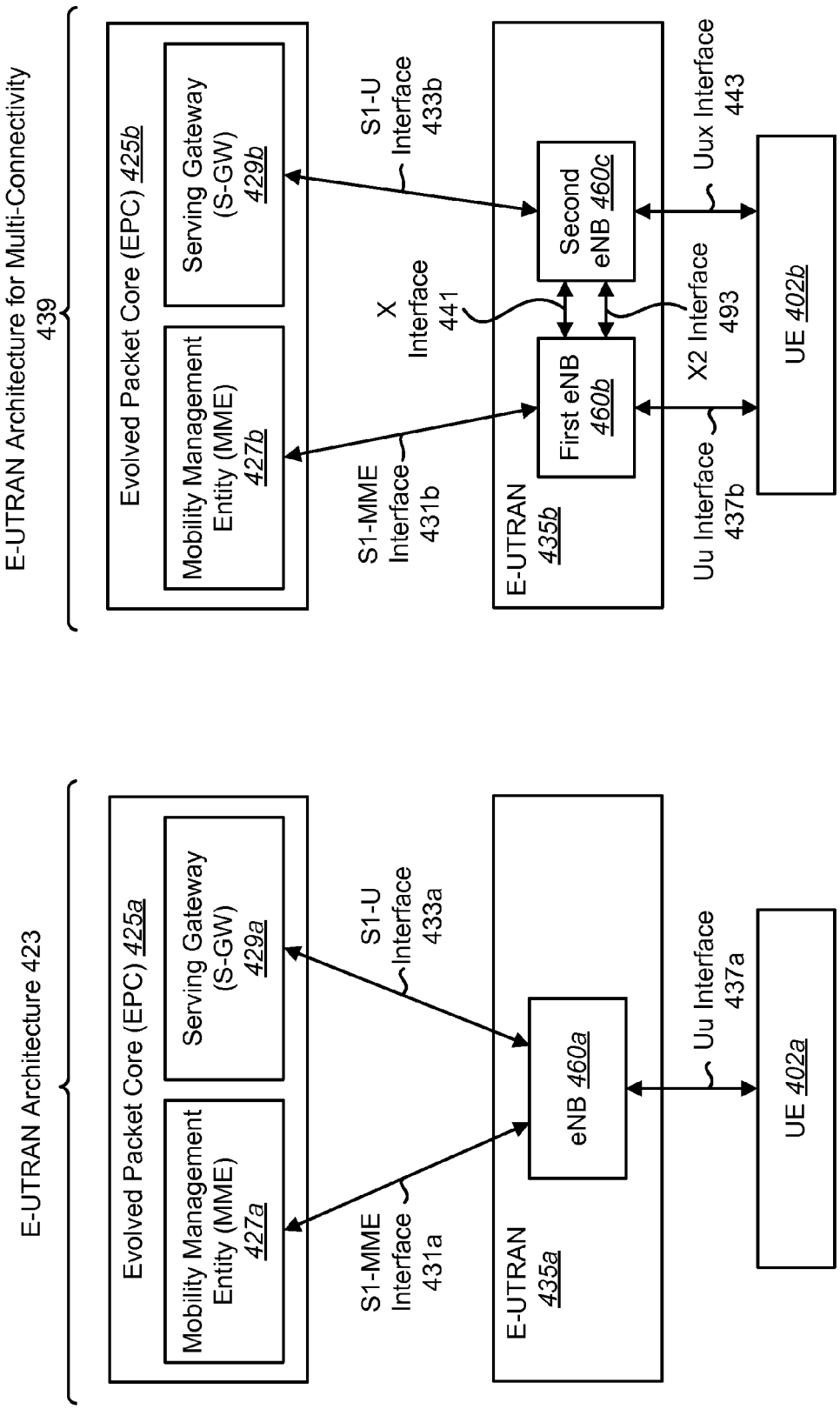
FIG. 4 is a block diagram illustrating configurations of Evolved Universal Terrestrial Radio Access Network (E-UTRAN) architecture in which systems and methods for establishing multiple connections may be implemented.

FIG. 4 is a block diagram illustrating configurations of E-UTRAN architecture 423, 439 in which systems and methods for establishing multiple connections may be implemented. The UE 402a and UE 402b described in connection with FIG. 4 may be implemented in accordance with the UE 102 described in connection with FIG. 1. In some configurations, both UEs 402a-b may be implemented in a single device. The eNBs 460a-c described in connection with FIG. 4 may be implemented in accordance with the eNB 160 described in connection with FIG. 1. The eNBs 460a-c may be a single device or multiple devices. In the traditional E-UTRAN architecture 423, the E-UTRAN 435a includes one or more eNBs 460a, providing the E-UTRA user plane (PDCP/RLC/MAC/PHY) and control plane (RRC) protocol terminations towards the UE 402a. The eNBs 460a may be interconnected with each other by an X2 interface (not shown in the figure). The eNBs 460a may also be connected by the S1 interface 431, 433 to the evolved packet core (EPC) 425a. For instance, the eNBs 460a may be connected to a mobility management entity (MME) 427a by the S1-MME 431a interface and to the serving gateway (S-GW) 429a by the S1-U interface 433a. The S1 interface 431, 433 supports a many-to-many relation between MMEs 427, serving gateways 429 and the eNBs 460a. The S1-MME interface 431a is the S1 interface 431, 433 for the control plane and the S1-U interface 433a is the S1 interface 431, 433 for the user plane. The Uu interface 437a is a radio interface between the UE 402a and the eNB 460a for the radio protocol of E-UTRAN 435a.

The eNBs 460a may host a variety of functions. For example, the eNBs 460 may host functions for radio resource management (e.g., radio bearer control, radio admission control, connection mobility control, dynamic allocation of resources to UEs 402a in both uplink and downlink (scheduling)). The eNBs 460a may also perform IP header compression and encryption of user data stream; selection of an MME 427a at UE 402a attachment when no routing to an MME 427a can be determined from the information provided by the UE 402a; and routing of user plane data towards the serving gateway 429a. The eNBs 460a may additionally perform scheduling and transmission of paging messages (originated from the MME 427a); scheduling and transmission of broadcast information (originated from the MME or operation and maintenance (O&M)); measurement and measurement reporting configuration for mobility and scheduling; and scheduling and transmission of the public warning system (PWS) (which may include the earthquake and tsunami warning system (ETWS) and commercial mobile alert system (CMAS)) messages (originated from the MME 427a). The eNBs 460a may further perform closed subscriber group (CSG) handling and transport level packet marking in the uplink.

The MME 427a may host a variety of functions. For example, the MME 427a may perform Non-Access Stratum (NAS) signaling; NAS signaling security; access stratum (AS) security control; inter core network (CN) node signaling for mobility between 3GPP access networks; and idle mode UE Reachability (including control and execution of paging retransmission). The MME 427a may also perform tracking area list management (for a UE 402a in idle and active mode); packet data network gateway (PDN GW) and S-GW selection; MME 427 selection for handovers with MME 427 change; and Serving GPRS Support Node (SGSN) selection for handovers to 2G or 3G 3GPP access networks. The MME 427a may additionally host roaming, authentication, and bearer management functions (including dedicated bearer establishment). The MME 427a may provide support for PWS (which includes ETWS and CMAS) message transmission, and may optionally perform paging optimization.

The S-GW 429a may also host the following functions. The S-GW 429a may host the local mobility anchor point for inter-eNB 460a handover. The S-GW 429a may perform mobility anchoring for inter-3GPP mobility; E-UTRAN idle mode downlink packet buffering and initiation of network triggered service request procedure; lawful interception; and packet routing and forwarding. The S-GW 429a may also perform transport level packet marking in the uplink and the downlink; accounting on user and QoS Class Identifier (QCI) granularity for inter-operator charging; and UL and DL charging per UE 402a, packet data network (PDN), and QCI.

The radio protocol architecture of E-UTRAN 435a may include the user plane and the control plane. The user plane protocol stack may include PDCP, RLC, MAC and PHY sublayers. The PDCP, RLC, MAC and PHY sublayers (terminated at the eNB 460a on the network) may perform functions (e.g., header compression, ciphering, scheduling, ARQ and HARQ) for the user plane. PDCP entities are located in the PDCP sublayer. RLC entities are located in the RLC sublayer. MAC entities are located in the MAC sublayer. The PHY entities are located in the PHY sublayer.

The control plane may include a control plane protocol stack. The PDCP sublayer (terminated in eNB 460b on the network side) may perform functions (e.g., ciphering and integrity protection) for the control plane. The RLC and MAC sublayers (terminated in eNB on the network side) may perform the same functions as for the user plane. The RRC (terminated in eNB 460a on the network side) may perform the following functions. The RRC may perform broadcast functions, paging, RRC connection management, radio bearer (RB) control, mobility functions, UE 402a measurement reporting and control. The NAS control protocol (terminated in MME 427a on the network side) may perform, among other things, evolved packet system (EPS) bearer management, authentication, evolved packet system connection management (ECM)-IDLE mobility handling, paging origination in ECM-IDLE and security control.

Signaling Radio Bearers (SRBs) are Radio Bearers (RB) that may be used only for the transmission of RRC and NAS messages. Three SRBs are defined. SRB0 may be used for RRC messages using the common control channel (CCCH) logical channel. SRB1 may be used for RRC messages (which may include a piggybacked NAS message) as well as for NAS messages prior to the establishment of SRB2, all using the dedicated control channel (DCCH) logical channel. SRB2 may be used for RRC messages which include logged measurement information as well as for NAS messages, all using the DCCH logical channel. SRB2 has a lower-priority than SRB1 and may be configured by E-UTRAN 435a after security activation.

RRC connection establishment may involve the establishment of SRB1. Upon initiating the initial security activation procedure, E-UTRAN 435a may initiate the establishment of SRB2 and DRBs. The E-UTRAN 435a may do this prior to receiving the confirmation of the initial security activation from the UE 402a.

PDCP may be established for each SRB1, SRB2, and DRB. RLC may be established for each SRB0, SRB1, SRB2, and DRB.

RRC may be responsible for the establishment, maintenance and release of an RRC connection between the UE 402a and the E-UTRAN 435a including allocation of temporary identifiers between the UE 402a and the E-UTRAN 435a and configuration of SRBs for RRC connection, etc. RRC may be responsible for the establishment, configuration, maintenance and release of point to point RBs.

The E-UTRAN architecture for multi-connectivity 439 is one example of E-UTRAN architecture that may provide multi-connectivity for a UE 402b. In this configuration, the UE 402b may connect to E-UTRAN 435b via a Uu interface 437b and a Uux interface 443. The E-UTRAN 435b may include a first eNB 460b and a second eNB 460c. The eNBs 460b-c may provide the E-UTRA user plane (PDCP/RLC/MAC/PHY) and control plane (RRC) protocol terminations towards the UE 402b. The eNBs 460b-c may be interconnected with each other by an X2 interface 493. The S1 interface 431, 433 may support a many-to-many relation between MMEs 427b, serving gateways 429b and eNBs 460b-c. The first eNB (e.g., PeNB) 460b and the second eNB (e.g., SeNB) 460c may also be interconnected with each other by means of one or more X interfaces 441, which may or may not be the same as the S1-MME 431b and/or X2 interface.

The first eNB 460b and the second eNB 460c may be connected by the S1 interface 431, 433 to the EPC 425b. The first eNB 460b may be connected to the MME 427b by the S1-MME interface 431b. The second eNB 460c may be connected to the serving gateway 429b by the S1-U interface 433b. The first eNB 460b may behave as the MME 427b for the second eNB 460c so that S1-MME interface 431b for the second eNB 460c may be connected (via the X interface 441, for instance) between the first eNB 460b and the second eNB 460c. Therefore, the first eNB 460b may appear to the second eNB 460c as an MME 427b (based on the S1-MME interface 431b) and an eNB 460 (based on the X2 interface 493).

With this architecture 439, terminations on the E-UTRAN 435b for the S1 interface 431, 433 for user plane and for the control plane may be separated. For example, the user plane may use the first eNB 460b and the S1-U interface 433b and the control plane may use second eNB 460c and the S1-MME interface 431b. By separating S1 interface 431, 433 between the user plane and the control plane, an MME 427 change may be mitigated as long as the UE 402b is in the coverage of the first eNB 460b. Also, if a proxy gateway is located in between the second eNB 460c and S-GW 429b, the mobility signal in the case of a handover between the SeNBs would be mitigated. The proxy gateway may allow the S1 interface 431, 433 between the SeNB and the EPC 425b to support a large number of SeNBs in a scalable manner.

With the architecture 439 illustrated in FIG. 4, the first eNB 460b (e.g., first point) may be connected to the mobility management entity (MME) and the second eNB 460c (e.g., second point) may be connected to one or more of an S-GW 429b and a proxy gateway between the second eNB 460c and the S-GW 429b. The first eNB 460b may be a termination for the user plane protocol and the second eNB 460c may be a termination for the control plane protocol.

It should be noted that both UEs 402a-b described in connection with FIG. 4 may be implemented in the same device in some configurations. For example, a single device may include both the UE 402a and the UE 402b. Additionally or alternatively, one or more of the eNBs 460a-c may be a single device or multiple devices in some configurations.

Figure 5:
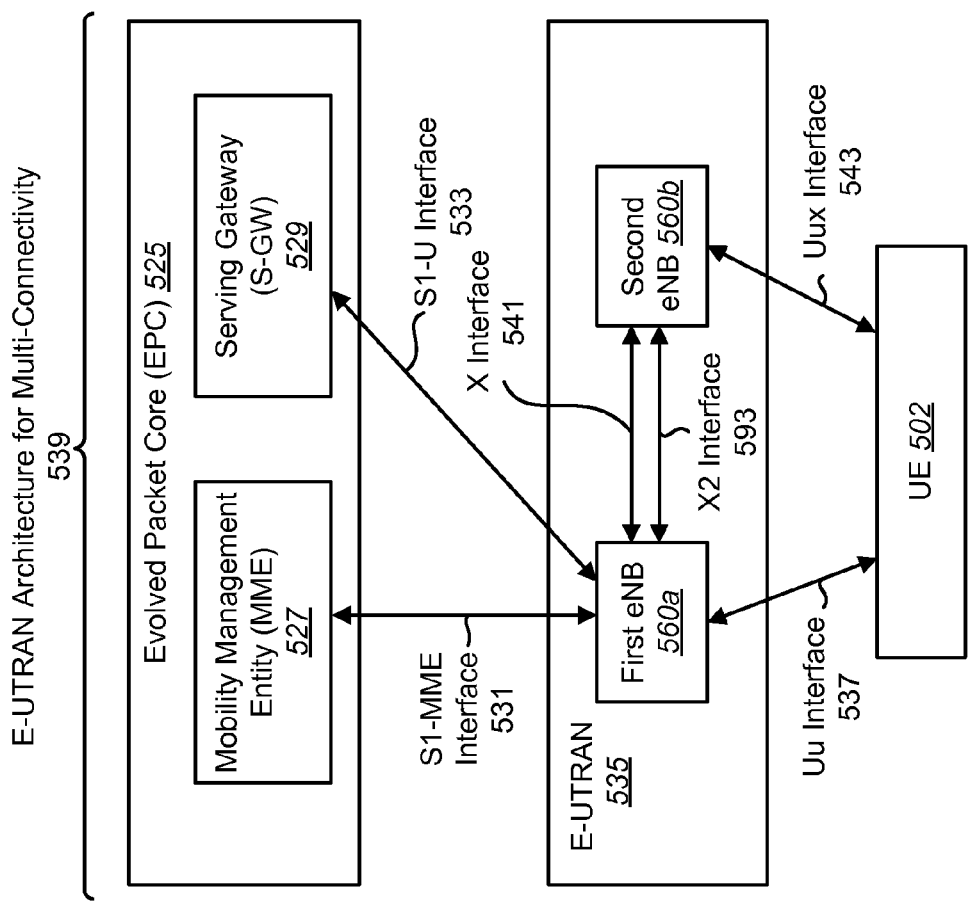
FIG. 5 is a block diagram illustrating another configuration of E-UTRAN architecture for multi-connectivity in which systems and methods for establishing multiple connections may be implemented.

FIG. 5 is a block diagram illustrating another configuration of E-UTRAN architecture for multi-connectivity 539 in which systems and methods for establishing multiple connections may be implemented. The UE 502 described in connection with FIG. 5 may be implemented in accordance with the UE 102 described in connection with FIG. 1. The eNBs 560a-b described in connection with FIG. 5 may be implemented in accordance with the eNB 160 described in connection with FIG. 1. In this configuration, the UE 502 may connect to E-UTRAN 535 via a Uu interface 537 and a Uux interface 543. The E-UTRAN 535 may include a first eNB 560a and a second eNB 560b. The eNBs 560a-b may provide the E-UTRA user plane (PDCP/RLC/MAC/PHY) and control plane (RRC) protocol terminations towards the UE 502. The eNBs 560a-b may be interconnected with each other by the X2 interface 593. The S1 interface 531, 533 may support a many-to-many relation between the MMEs 527, serving gateways 529 and the eNBs 560a-b. The first eNB (e.g., PeNB) 560a and the second eNB (e.g., SeNB) 560b may also be interconnected with each other by one or more X interfaces 541, which may or may not be the same as the S1-MME interface 531, X2 interface 593, and/or the S1-U interface 533.

The first eNB 560a may be connected by the S1 interface 531, 533 to the EPC 525. The first eNB 560a may be connected to the MME 527 by the S1-MME interface 531 and to the serving gateway 529 by the S1-U interface 533. Therefore, the second eNB 560b may not be connected to the EPC 525. The first eNB 560a may appear to the second eNB 560b as an MME 527 (based on the S1-MME interface 531), an eNB (based on the X2 interface 593), and an S-GW (based on the S1-U interface 533). This architecture 539 may provide a single node S1 interface 531, 533 (e.g., connection) with the EPC 525 for the first eNB 560a and the second eNB 560b. By the single node connection with EPC 525, MME 527 and S-GW 529, a change (e.g., handover) could be mitigated as long as the UE 502 is in the coverage of the first eNB 560a.

With the architecture 539 illustrated in FIG. 5, the first eNB 560a (e.g., first point) may be connected to the MME 527 and to the serving gateway 529. The first eNB 560a may be a termination for the user plane protocol and a termination for the control plane protocol.

Figure 6:
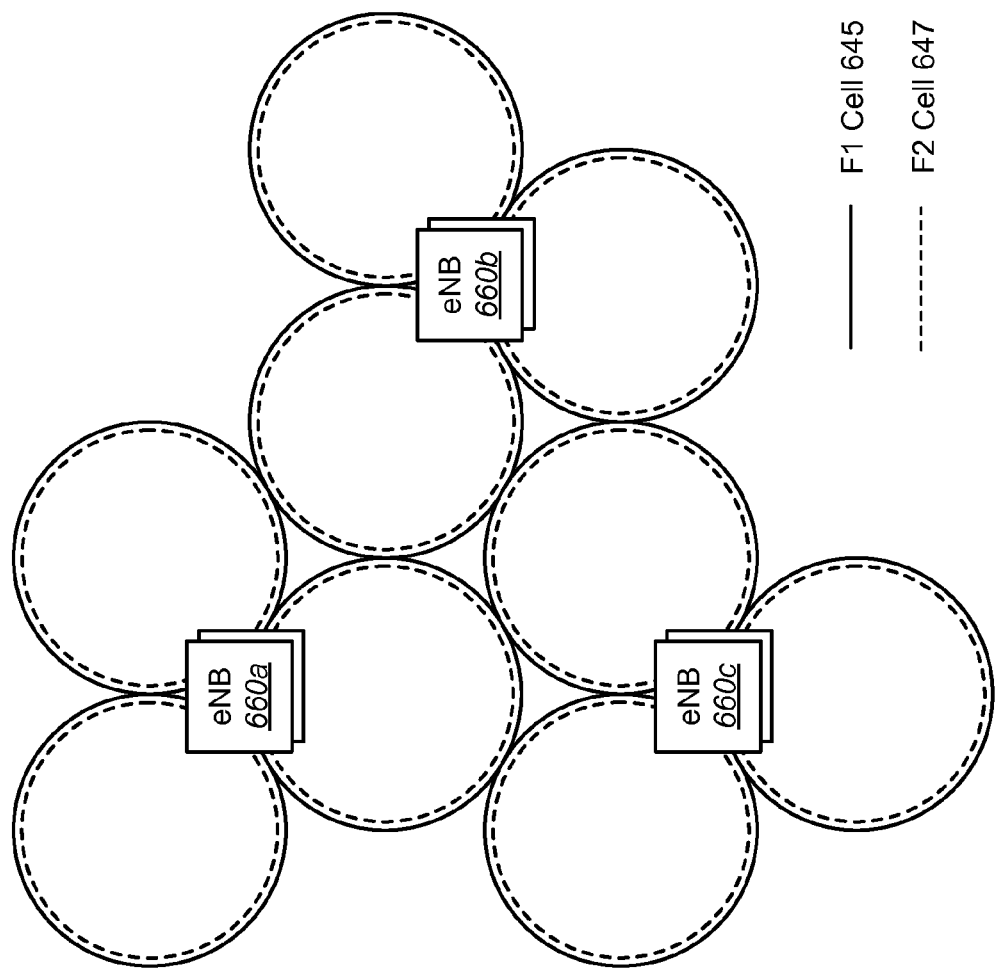
FIG. 6 is a block diagram illustrating a carrier aggregation configuration in which a first cell and a second cell are co-located, overlaid and have equal coverage.

FIG. 6 is a block diagram illustrating a carrier aggregation configuration in which a first cell 645 and a second cell 647 are co-located, overlaid and have equal coverage. In traditional CA, two or more component carriers (CCs) may be aggregated to support wider transmission bandwidths. A UE 102 may simultaneously receive or transmit on one or multiple CCs depending on the capabilities of the UE 102.

For example, according to Rel-10 and later, a UE 102 with reception and/or transmission capabilities for CA may simultaneously receive and/or transmit on multiple CCs corresponding to multiple serving cells. According to Rel-8 and Rel-9, a UE 102 may receive on a single CC and transmit on a single CC corresponding to one serving cell only.

When CA is configured, the UE 102 may have one radio resource control (RRC) connection with the network. One radio interface may provide carrier aggregation. During RRC connection establishment, re-establishment and handover, one serving cell may provide non-access stratum (NAS) mobility information (e.g. tracking area identity (TAI)). During RRC connection re-establishment and handover, one serving cell may provide a security input. This cell is referred to as the primary cell (PCell). In the downlink, the component carrier corresponding to the PCell is the downlink primary component carrier (DL PCC) while in the uplink it is the uplink primary component carrier (UL PCC).

Depending on UE 102 capabilities, secondary cells (SCells) may be configured to form together with the PCell a set of serving cells. In the downlink, the component carrier corresponding to an SCell is a downlink secondary component carrier (DL SCC) while in the uplink it is an uplink secondary component carrier (UL SCC).

The configured set of serving cells for a UE 102, therefore, may consist of one PCell and one or more SCells. For each SCell, the usage of uplink resources by the UE 102 (in addition to the downlink resources) may be configurable. The number of DL SCCs configured may be larger than or equal to the number of UL SCCs and no SCell may be configured for usage of uplink resources only.

Additionally, according to the systems and methods disclosed herein, a first radio interface may have a PCell and optionally one or more SCells and a second radio interface may have a PCell and optionally one or more SCells. However, in some configurations, the PCell of the second radio interface may provide different functionalities than the PCell of the first radio interface. In some configurations, the PCell of the second radio interface may provide a part of functionalities of the PCell of the first radio interface. In some configurations, the second radio interface may not provide a PCell and may only provide one or more SCells.

From a UE 102 viewpoint, each uplink resource may belong to one serving cell. The number of serving cells that may be configured depends on the aggregation capability of the UE 102. The PCell may only be changed with handover procedure (e.g., with a security key change and random access channel (RACH) procedure). The PCell may be used for transmission of the physical uplink control channel (PUCCH). Unlike the SCells, the PCell may not be de-activated. Re-establishment may be triggered when the PCell experiences radio link failure (RLF), not when the SCells experience RLF. Furthermore, NAS information may be taken from PCell.

The reconfiguration, addition and removal of SCells may be performed by RRC. At intra-LTE handover, RRC may also add, remove or reconfigure SCells for usage with a target PCell. When adding a new SCell, dedicated RRC signaling may be used for sending all required system information of the SCell (e.g., while in connected mode, UEs 102 need not acquire broadcasted system information directly from the SCells).

As illustrated in FIG. 6, one CA deployment configuration includes frequency 1 (F1) cells 645 and frequency 2 (F2) cells 647 that are co-located and overlaid. It should be noted that CA scenarios (e.g., deployment configurations) may be independent of small cell scenarios. The eNBs 660*a-c* described in connection with FIG. 6 may be implemented in accordance with the eNB 160 described in connection with FIG. 1. In this configuration, multiple eNBs 660*a-c* may provide coverage for the F1 cells 645 and F2 cells 647. The systems and methods disclosed herein may be used to establish radio interfaces between the F1 cells 645 and F2 cells 647.

The coverage of the F1 cells 645 and the F2 cells 647 may be the same or nearly the same. Both layers (i.e., frequency layers) may provide sufficient coverage and mobility can be supported on both layers. A likely scenario for this configuration is when F1 and F2 are of the same band (e.g., 2 GHz, 800 MHz, etc.). It is expected that CA is possible between the overlaid F1 cell 645 and F2 cell 647.

Figure 7:
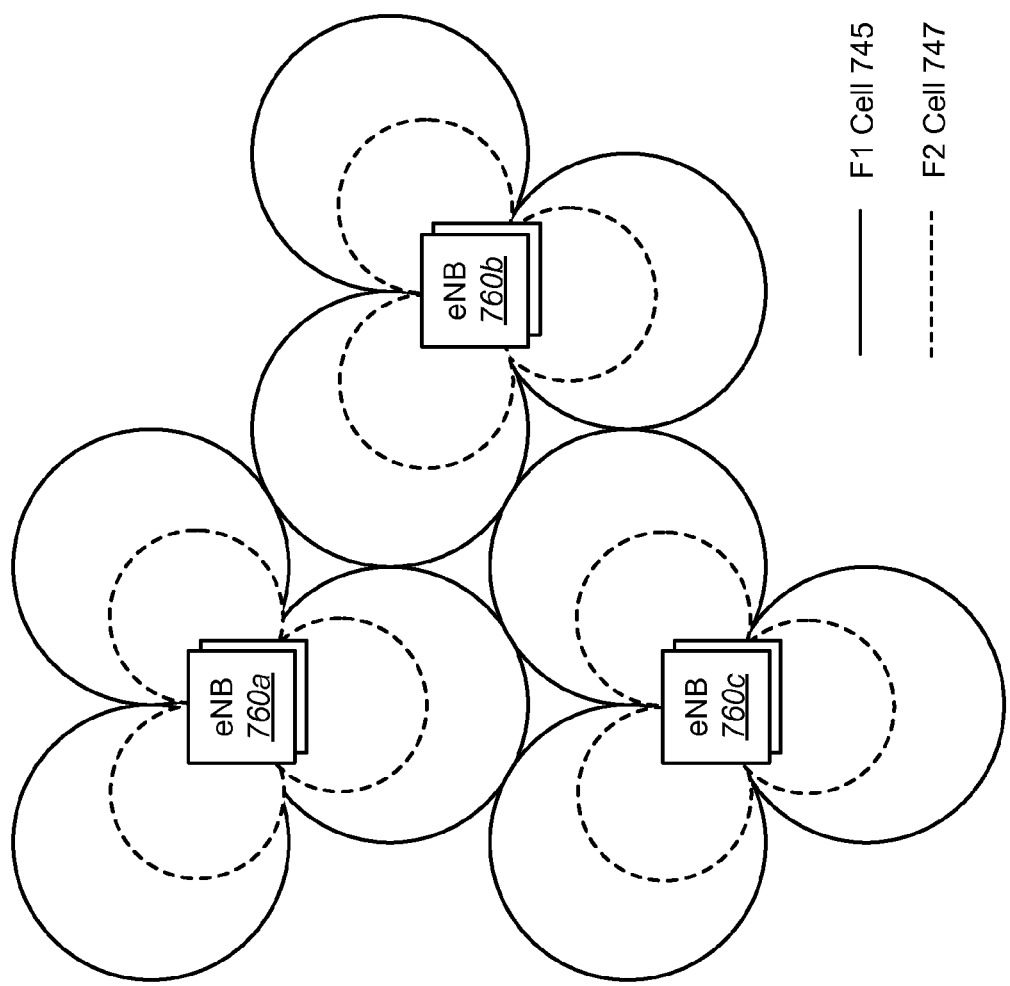
FIG. 7 is a block diagram illustrating a carrier aggregation configuration in which a first cell and a second cell are co-located and overlaid, but the second cell has smaller coverage.

FIG. 7 is a block diagram illustrating a carrier aggregation configuration in which F1 cells 745 and a F2 cells 747 are co-located and overlaid, but the F2 cells 747 have smaller coverage. The eNBs 760*a-c* described in connection with FIG. 7 may be implemented in accordance with the eNB 160 described in connection with FIG. 1. In this configuration, multiple eNBs 760*a-c* may provide coverage for the F1 cells 745 and the F2 cells 747. The systems and methods disclosed herein may be used to establish radio interfaces between the F1 cells 745 and F2 cells 747.

In this configuration, the F1 cells 745 and the F2 cells 747 are co-located and overlaid, but the F2 cells 747 have smaller coverage due to larger path loss. Only the F1 provides sufficient coverage and the F2 is used to improve throughput. Mobility is performed based on F1 coverage. A likely scenario for this configuration is when the F1 and the F2 are of different bands. For example, the F1 may equal 800 MHz or 2 GHz and the F2 may equal 3.5 GHz, etc. It is expected that CA is possible between the overlaid F1 cell 745 and F2 cell 747.

Figure 8:
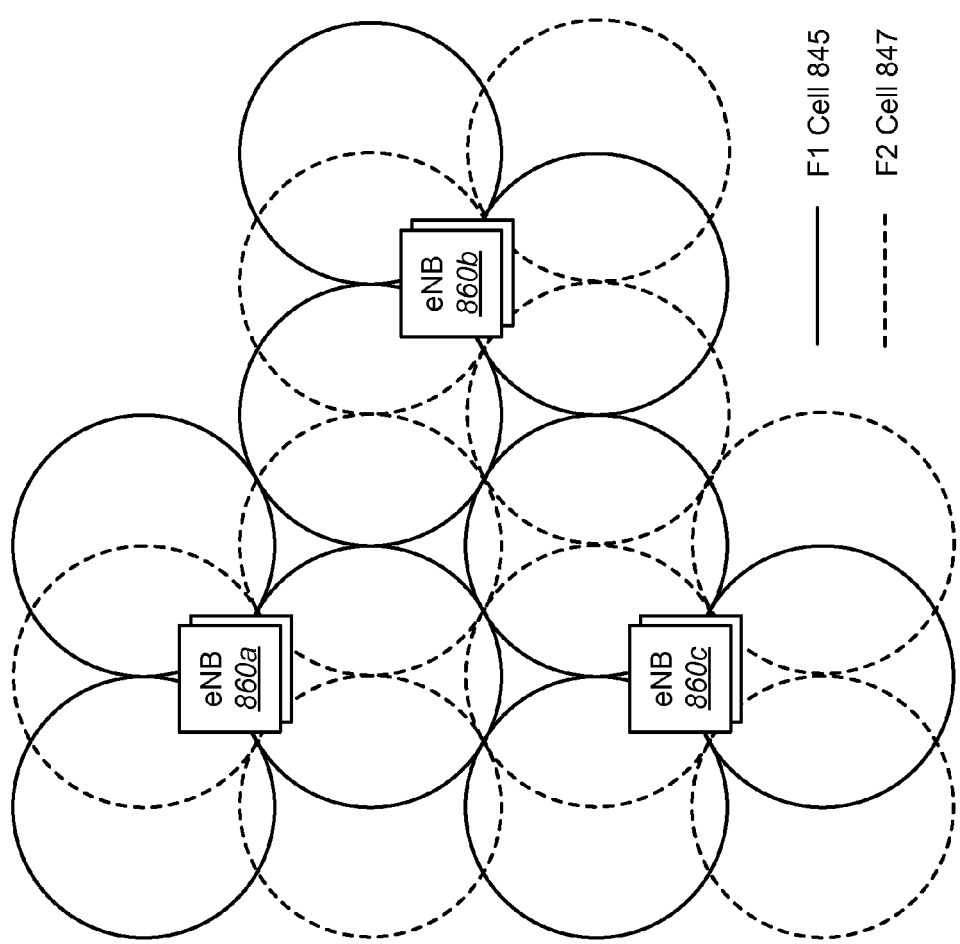
FIG. 8 is a block diagram illustrating a carrier aggregation configuration in which a first cell and a second cell are co-located but the second cell antennas are directed to the cell boundaries of the first cell.

FIG. 8 is a block diagram illustrating a carrier aggregation configuration in which a F1 cells 845 and a F2 cells 847 are co-located but the F2 antennas are directed to the cell boundaries of the F1. The eNB 860*a-c* described in connection with FIG. 8 may be implemented in accordance with the eNB 160 described in connection with FIG. 1. The systems and methods disclosed herein may be used to establish radio interfaces between the F1 cells 845 and F2 cells 847.

In this configuration, the F1 cells 845 and the F2 cells 847 are co-located but the F2 antennas are directed to the cell boundaries of the F1 so that cell edge throughput is increased. The F1 provides sufficient coverage but the F2 potentially has holes (e.g., due to larger path loss). Mobility is based on F1 coverage. A likely scenario for this configuration is when the F1 and the F2 are of different bands. For example, the F1 may equal 800 MHz or 2 GHz and the F2 may equal 3.5 GHz, etc. It is expected that the F1 cell 845 and the F2 cell 847 of the same eNB 860 may be aggregated where coverage overlaps.

Figure 9:
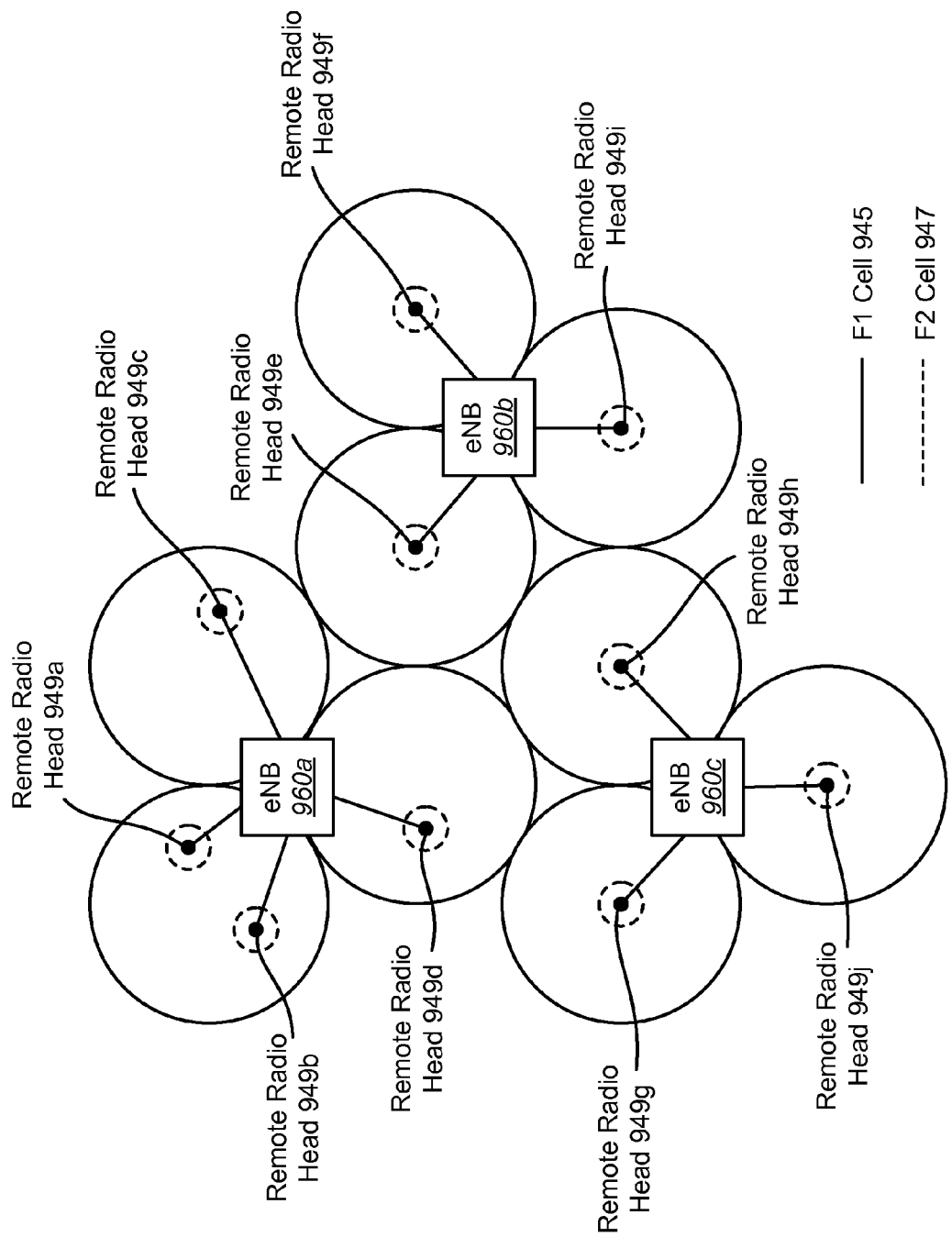
FIG. 9 is a block diagram illustrating a carrier aggregation configuration in which a first cell provides macro coverage and remote radio heads (RRH) on a second cell are used to improve throughput at hotspots.

FIG. 9 is a block diagram illustrating a carrier aggregation configuration in which F1 provides macro coverage and remote radio heads (RRH) 949*a-j* on F2 are used to improve throughput at hotspots. The eNB 960*a-c* described in connection with FIG. 9 may be implemented in accordance with the eNB 160 described in connection with FIG. 1. In this configuration, multiple eNBs 960*a-c* may provide macro coverage for a first cell 945. RRHs 949*a-j* may be connected to the eNBs 960*a-c* and may provide second cell 947 coverage. The systems and methods disclosed herein may be used to establish radio interfaces between the F1 cells 945 and F2 cells 947.

In this configuration, the F1 provides macro coverage and the remote radio heads (RRH) 949*a-j* on F2 are used to improve throughput at hotspots. Mobility is performed based on F1 coverage. A likely scenario for this configuration is when F1 and F2 are of different bands. For example, the F1 may equal 900 MHz or 2 GHz and F2 may equal 3.5 GHz, etc. It is expected that the F2 RRH cells 947 may be aggregated with the underlying F1 cell 945 (e.g., the macro cells).

Figure 10:
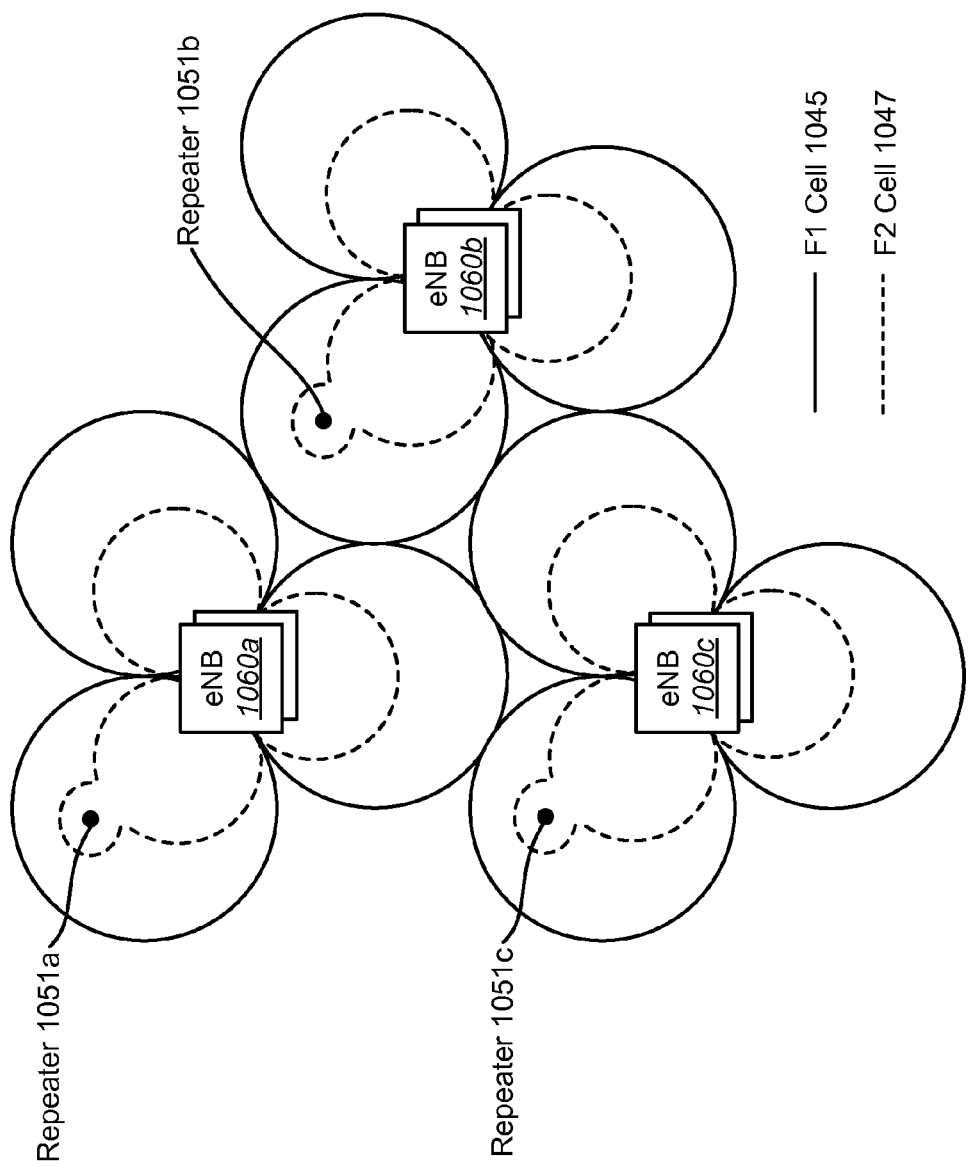
FIG. 10 is a block diagram illustrating a carrier aggregation configuration in which frequency selective repeaters are deployed.

FIG. 10 is a block diagram illustrating a carrier aggregation configuration in which frequency selective repeaters 1051*a-c* are deployed. This configuration is similar to the configuration described in connection with FIG. 7. The systems and methods disclosed herein may be used to establish radio interfaces between the F1 cells 1045 and F2 cells 1047. In this configuration, frequency selective repeaters 1051*a-c* are deployed so that coverage is extended for one of the carrier frequencies. The eNBs 1060*a-c* described in connection with FIG. 10 may be implemented in accordance with the eNB 160 described in connection with FIG. 1. Multiple eNBs 1060*a-c* may be associated with the F1 cells 1045. It is expected that an F1 cell 1045 and an F2 cell 1047 may be aggregated where coverage overlaps.

Figure 11:
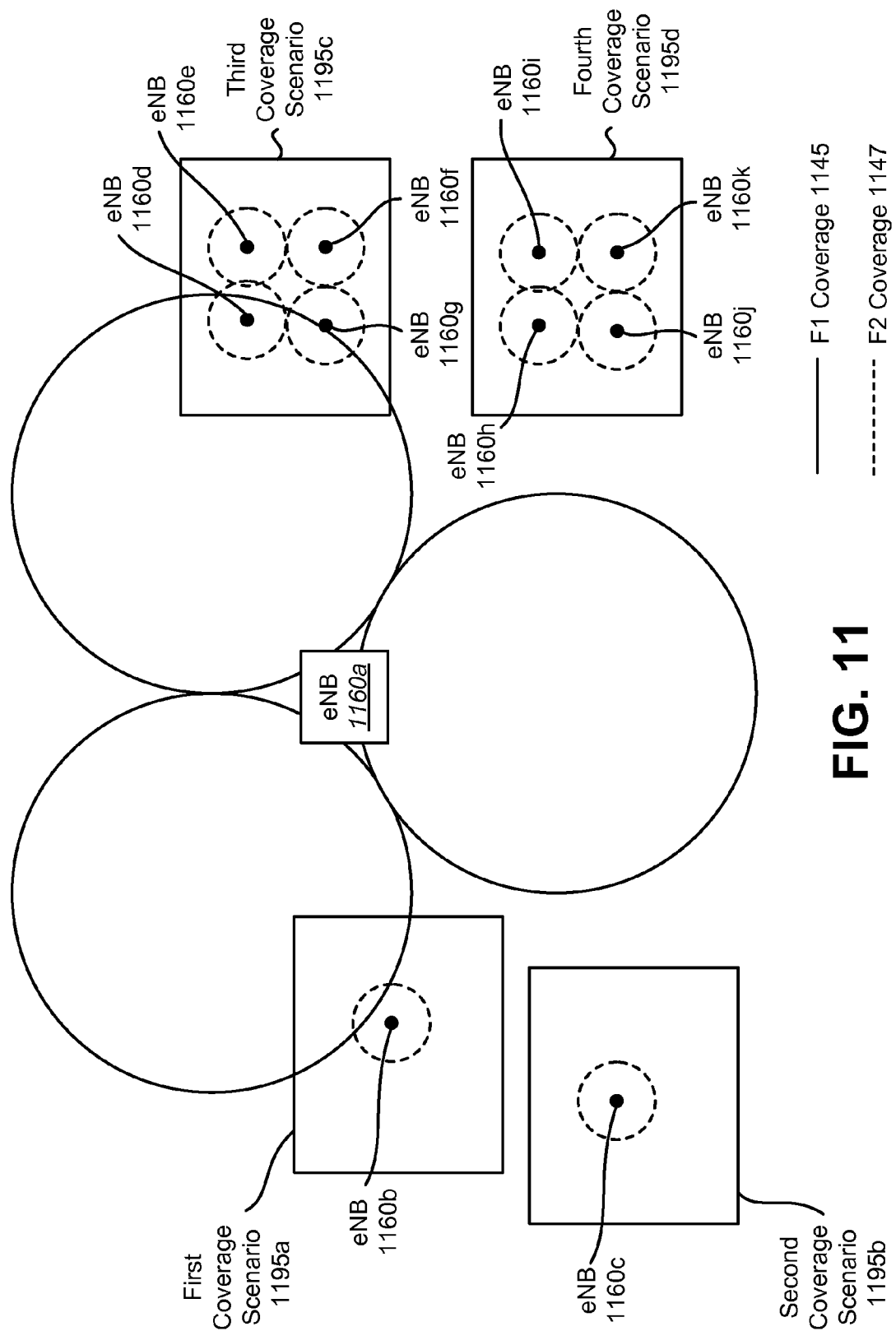
FIG. 11 is a block diagram illustrating multiple coverage scenarios for small cells with and without macro coverage.

FIG. 11 is a block diagram illustrating multiple coverage scenarios 1195 for small cells with and without macro coverage. The eNBs 1160*a-k* described in connection with FIG. 11 may be implemented in accordance with the eNB 160 described in connection with FIG. 1. The coverage scenarios 1195 include indoor and outdoor scenarios using low-power nodes (e.g., eNBs 1160*b-k*). These low-power nodes may provide small cell coverage (e.g., F2 coverage 1147). An eNB 1160*a* may provide macro cell coverage (e.g., F1 coverage 1145)

Small cell enhancements may target both scenarios in which macro coverage may or may not be present. The systems and methods described herein may provide for establishing multiple connections in small cell deployment scenarios. These scenarios may include both outdoor and indoor small cell deployments and both ideal and non-ideal backhaul. Additionally, multiple connections may be established in both sparse and dense small cell deployments.

The E-UTRAN architecture may be able to achieve the system and mobility performance for small cell enhancement. For example, the systems and methods described herein may provide the overall structure of control plane and user plane and their relation to each other. For example, the control plane and the user plane may be supported in different nodes, termination of different protocol layers, etc.

In a small cell deployment scenario, each node (e.g., eNB 1160*a-k*) may have its own independent scheduler. To maximize the efficient use of radio resources, a UE 102 may connect to multiple nodes that have different schedulers. To connect to multiple nodes that have different schedulers, multiple connections between the UE 102 and E-UTRAN 435 may be established.

The first coverage scenario 1195*a* illustrates a single small cell (e.g., the F2) with macro coverage (e.g., the F1). In FIG. 11, the F1 is the carrier frequency for the macro layer, and the F2 is the carrier frequency of the local-node layer. In the first coverage scenario 1195*a*, the macro cell may overlap the small cell.

The second coverage scenario 1195*b* illustrates a single small cell without macro coverage. The third coverage scenario 1195*c* illustrates multiple small cells with overlapping macro cell coverage. The fourth coverage scenario 1195*d* illustrates multiple small cells without macro cell coverage.

Figure 12:
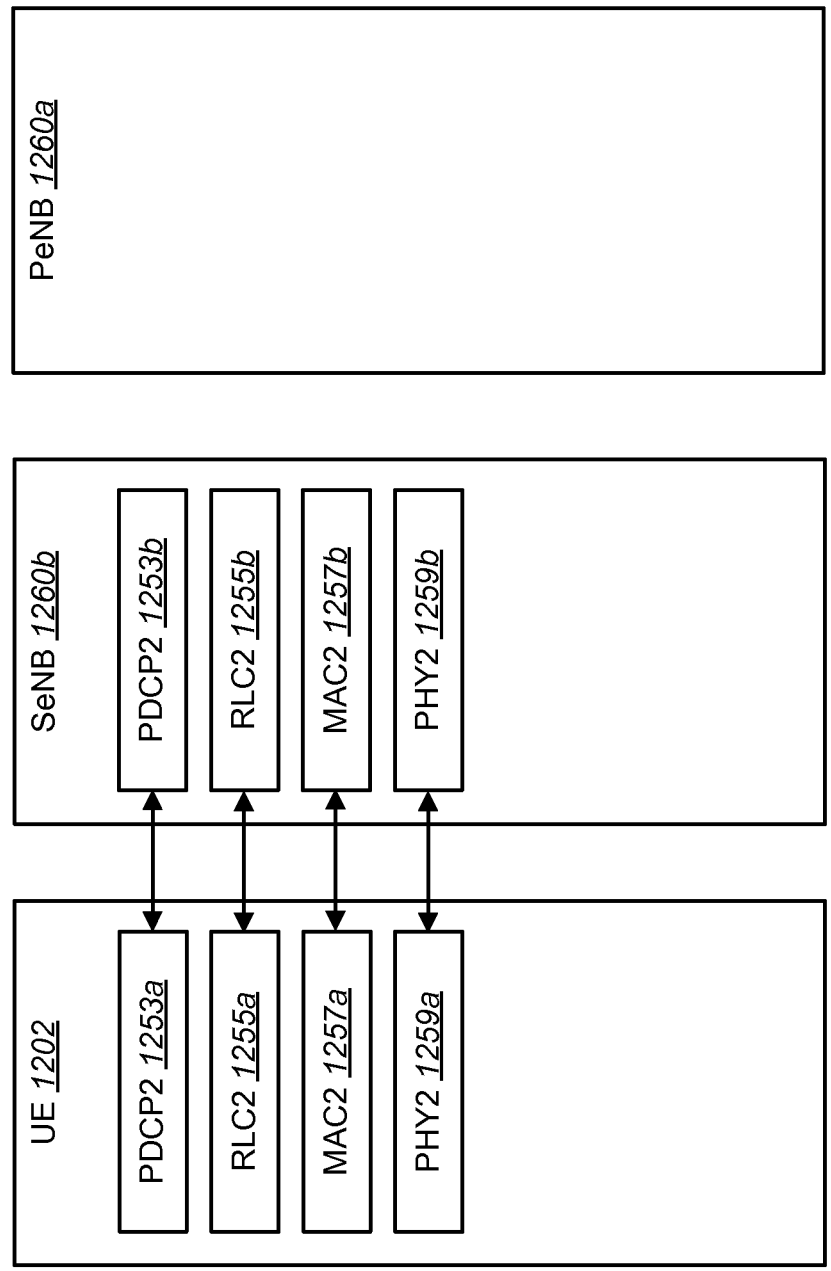
FIG. 12 is a block diagram illustrating one configuration of a user plane protocol stack for multi-connectivity.

FIG. 12 is a block diagram illustrating one configuration of a user plane protocol stack for multi-connectivity. The UE 1202 described in connection with FIG. 12 may be implemented in accordance with the UE 102 described in connection with FIG. 1. The eNBs 1260*a-b* described in connection with FIG. 12 may be implemented in accordance with the eNB 160 described in connection with FIG. 1. A UE 1202 may connect to a PeNB 1260*a* and an SeNB 1260*b*. The PeNB 1260*a* may be similar to the first eNB 160 and the SeNB 1260*b* may be similar to the second eNB 160 discussed in connection with FIG. 1.

In one configuration, the user plane protocol stack (e.g., PDCP2 1253, RLC2 1255, MAC2 1257 and PHY2 1259) may be mapped to a Uux interface 443. For example, all DRBs may be mapped to one radio interface. In the configuration illustrated in FIG. 12, the user plane uses only the Uux interface 443. In other words, the user plane protocol stack (e.g., PDCP2 1253*a*, RLC2 1255*a*, MAC2 1257*a* and PHY2 1259*a*) for the UE 1202 terminates with the SeNB 1260*b* and the user plane protocol stack (e.g., PDCP2 1253*b*, RLC2 1255*b*, MAC2 1257*b* and PHY2 1259*b*) for the SeNB 1260*b* terminates with the UE 1202.

This configuration may achieve user plane and control plane separation between two radio interfaces (e.g., the Uu interface 437 and the Uux interface 443). Therefore, the control plane protocol stack may be mapped to a first radio interface (e.g., Uu interface 437) and the user plane protocol stack may be mapped to a second radio interface (e.g., Uux interface 443). The Uu interface 437 does not provide DRBs and the Uux interface 443 provides DRBs for the UE 102. This configuration may be applied to both E-UTRAN architectures for multi-connectivity 439, 539 of FIG. 4 and FIG. 5, but if the E-UTRAN architecture 439 of FIG. 4 is used, traffic on the X interface 441 may be significantly reduced.

Figure 13:
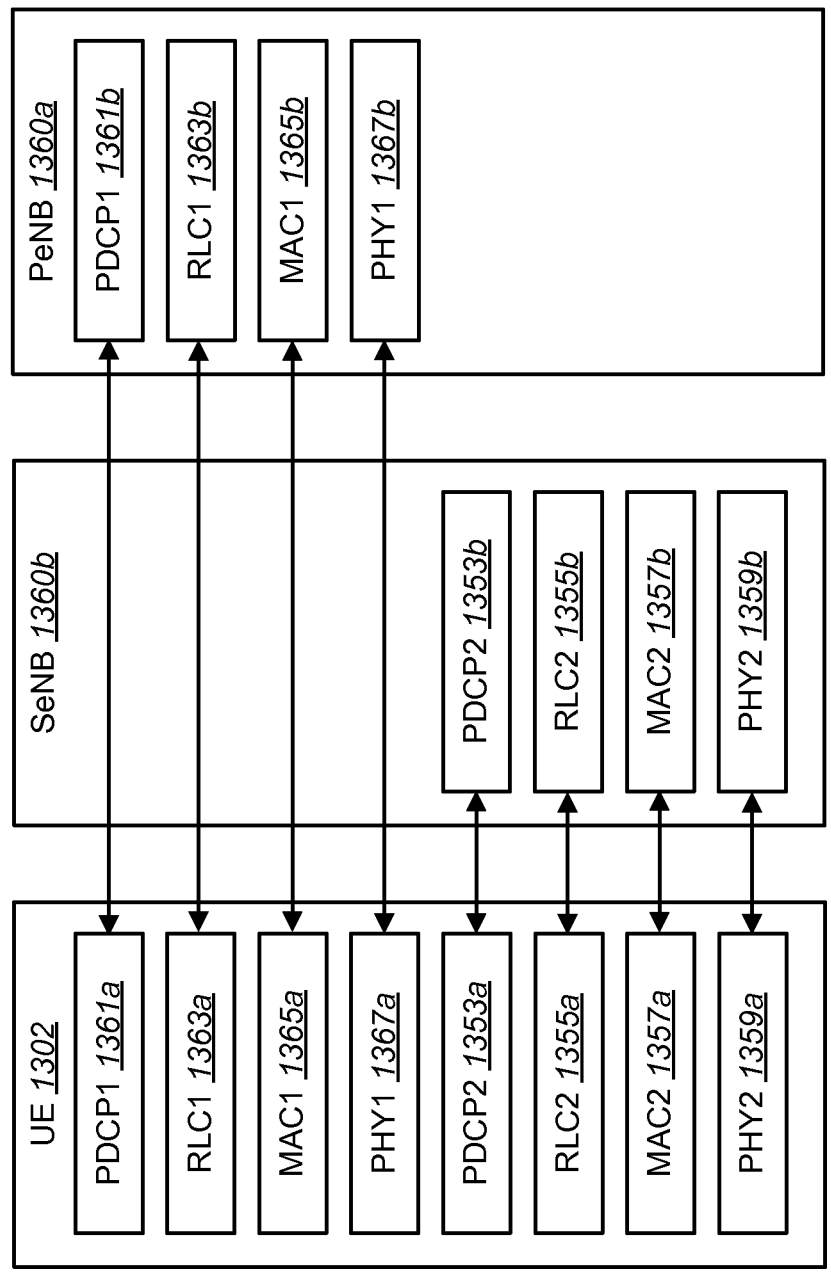
FIG. 13 is a block diagram illustrating another configuration of a user plane protocol stack for multi-connectivity.

FIG. 13 is a block diagram illustrating another configuration of a user plane protocol stack for multi-connectivity. The UE 1302 described in connection with FIG. 13 may be implemented in accordance with the UE 102 described in connection with FIG. 1. The PeNB 1360*a* and SeNB 1360*b* described in connection with FIG. 13 may be implemented in accordance with the eNB 160 described in connection with FIG. 1. A UE 1302 may connect to a PeNB 1360*a* and a SeNB 1360*b*. The PeNB 1360*a* may be similar to the first eNB 160 and the SeNB 1360*b* may be similar to the second eNB 160 discussed in connection with FIG. 1.

In this configuration, a set of DRBs may be mapped to one radio interface and another set of DRBs may be mapped to another radio interface. The DRBs may be mapped to user plane protocol stacks (e.g., PDCP, RLC, MAC and PHY). A first user plane protocol stack may be mapped to a first radio interface (e.g., Uu interface 437) and a second user plane protocol stack may be mapped to the second radio interface (e.g., the Uux interface 443). For example, PDCP1 1361 and PDCP2 1353, RLC1 1363 and RLC2 1355, MAC1 1365 and MAC2 1357, PHY1 1367 and PHY2 1359 may be the same sublayer but may have different entities. PDCP1 1361*a-b*, RLC1 1363 *a-b*, MAC1 1365*a-b* and PHY1 1367*a-b* are mapped to the Uu interface 437. PDCP2 1353*a-b*, RLC2 1355*a-b*, MAC2 1357*a-b* and PHY2 1359*a-b* are mapped to the Uux interface 443. In this configuration, the user plane uses both the Uu interface 437 and the Uux interface 443. Therefore, both the Uu interface 437 and the Uux interface 443 provide DRBs.

In some configurations, the RRC may need to control sublayers for the Uu interface 437 and the Uux interface 443 differently. The UE 1302 may be configured with DRBs to be mapped to either of radio interfaces 437, 443. RRC messages which are sent from the E-UTRAN 435 to the UE 1302 may carry information to configure and modify an identity of the Uu interface 437 (e.g., the Uu interface 437 may be represented by an identity of a Uu interface 437, an identity of a sub-RRC connection or an identity of an RRC connection) mapped to a radio bearer. DRB addition, modification and release by RRC signaling may be associated with a certain radio interface (e.g., the Uu interface 437). DRB configurations (e.g., DRB addition, modification and release) may include PDCP configuration, RLC configuration and/or logical channel configuration. SRB1 may be used to configure, modify and release DRBs for the Uux interface 443.

Figure 14:
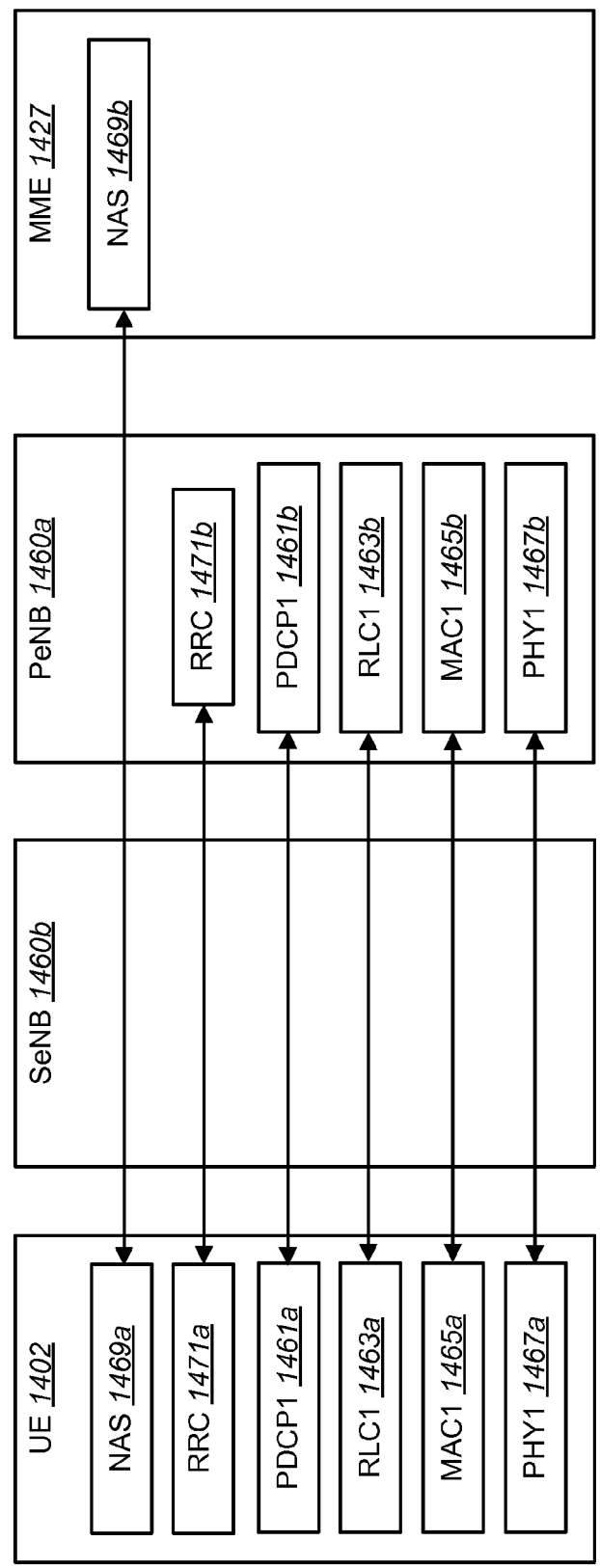
FIG. 14 is a block diagram illustrating a configuration of a control plane protocol stack for a single radio resource control (RRC) connection.

FIG. 14 is a block diagram illustrating a configuration of a control plane protocol stack for a single RRC connection. The UE 1402 described in connection with FIG. 14 may be implemented in accordance with the UE 102 described in connection with FIG. 1. The PeNB 1460a and SeNB 1460b described in connection with FIG. 14 may be implemented in accordance with the eNB 160 described in connection with FIG. 1. For multiple Uu interface 437 operation, the UE 1402 may have one RRC connection, may have multiple RRC connections or may have one RRC connection and multiple sub-RRC connections.

RRC messages may be exchanged between the UE 1402 and E-UTRAN 435 to establish another RRC connection. RRC messages may also be exchanged between the UE 1402 and E-UTRAN 435 to establish one or more sub-RRC connections. The Uu interface 437 may provide RRC signaling (e.g., SRBs). The Uux interface 443 may or may not provide SRB0, SRB1 and/or SRB2. For example, the Uux interface 443 may transport only DRBs. SRB1 may be used to configure, modify and release the DRBs for the Uux interface 443. In another example, the Uux interface 443 may provide SRB1 and SRB2. Both the Uu interface 437 and the Uux interface 443 may share the same SRBs. In yet another example, the Uux interface 443 may provide SRB1 and SRB2. The Uu interface 437 and the Uux interface 443 may have their own SRBs. SRB1 on the Uu interface 437 may be used to configure, modify and release SRB1 for the Uux interface 443. This may be applicable to the case of multiple RRC connections or multiple sub-RRC connections.

In FIG. 14, a UE 1402 may connect to a PeNB 1460a and a SeNB 1460b. The PeNB 1460a may be similar to the first eNB 160 and the SeNB 1460b may be similar to the second eNB 160 discussed in connection with FIG. 1. An MME 1427 may provide a NAS message 1469a-b (e.g., piggybacked with the RRC messages 1471a-b, for instance). The user plane protocol stack (e.g., PDCP1 1461a-b, RLC1 1463a-b, MAC1 1465a-b and PHY1 1467a-b) is mapped to the Uu interface 437. In this configuration, SRBs (e.g., RRC messages 1471a-b) are provided over Uu interface 437. In this case the Uux interface 443 provides only DRBs.

Figure 15:
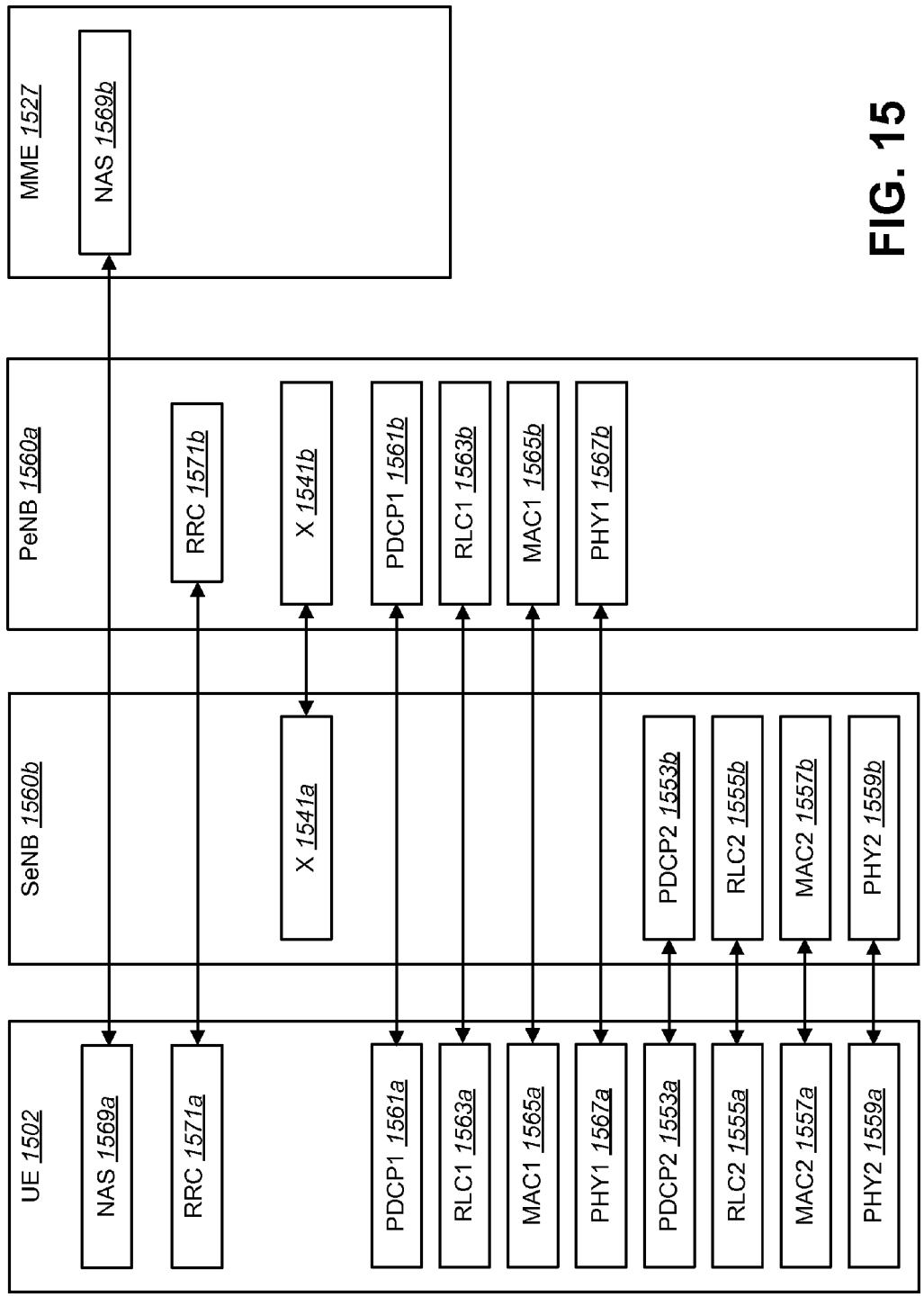
FIG. 15 is a block diagram illustrating a configuration of a control plane protocol stack with multiple RRC connections.

FIG. 15 is a block diagram illustrating a configuration of a control plane protocol stack with multiple RRC connections. The UE 1502 described in connection with FIG. 15 may be implemented in accordance with the UE 102 described in connection with FIG. 1. The PeNB 1560a and SeNB 1560b described in connection with FIG. 15 may be implemented in accordance with the eNB 160 described in connection with FIG. 1. In this configuration, a UE 1502 may connect to a PeNB 1560a and a SeNB 1560b. The PeNB 1560a may be similar to the first eNB 160 and the SeNB 1560b may be similar to the second eNB 160 discussed in connection with FIG. 1. An MME 1527 may provide a NAS message 1569a-b (e.g., piggybacked with the RRC messages 1571a-b, for instance). A first user plane protocol stack (e.g., PDCP1 1561a-b, RLC1 1563a-b, MAC1 1565a-b and PHY1 1567a-b) is mapped to the Uu interface 437. A second user plane protocol stack (e.g., PDCP2 1553a-b, RLC2 1555a-b, MAC2 1557a-b and PHY2 1559a-b) is mapped to the Uux interface 443.

In this configuration, SRBs (e.g., RRC messages 1571a-b) are provided over the Uu interface 437 and the Uux interface 443. The Uu interface 437 and the Uux interface 443 may share the same SRBs. The X interface (and X protocol) 1541a-b may be used to exchange data between SeNB 1560b and PeNB 1560a. Although both radio interfaces are used to transport RRC messages 1571a-b, the RRC protocol is terminated at one node. For example, the SeNB 1560b transfers, to the PeNB 1560a, RRC messages 1571a-b that are received from the UE 1502. Additionally, the SeNB 1560b transfers, to the UE 1502, RRC messages 1571a-b that are received from the PeNB 1560a. Therefore, RRC messages 1571a-b may be terminated at a single point on E-UTRAN 435. In other words, the UE 1502 may send RRC messages toward a single point on E-UTRAN 435.

Figure 16:
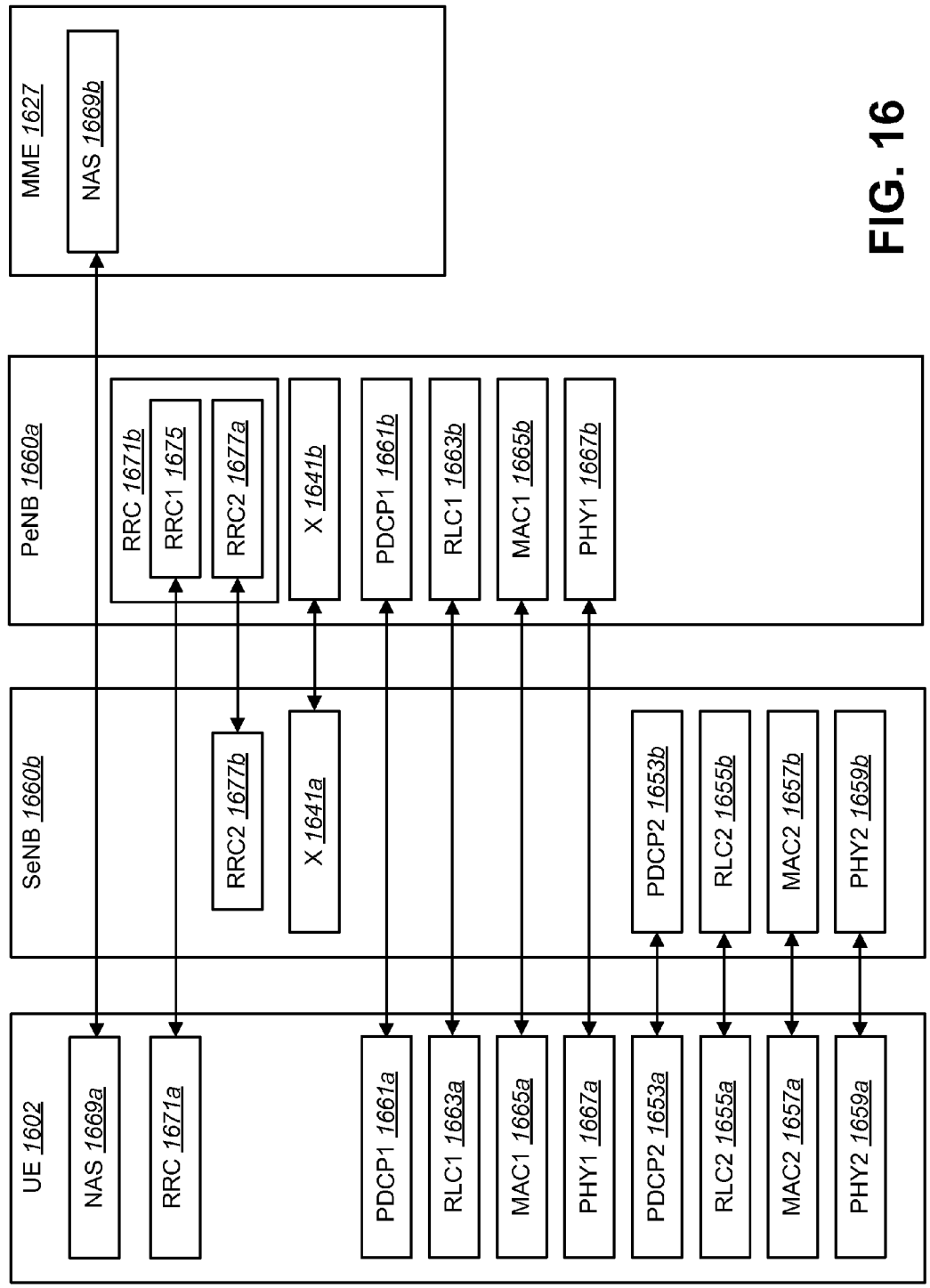
FIG. 16 is a block diagram illustrating one configuration of RRC message management.

FIG. 16 is a block diagram illustrating one configuration of RRC message 1671 management. The UE 1602 described in connection with FIG. 16 may be implemented in accordance with the UE 102 described in connection with FIG. 1. The PeNB 1660a and SeNB 1660b described in connection with FIG. 16 may be implemented in accordance with the eNB 160 described in connection with FIG. 1. In this configuration, a UE 1602 may connect to a PeNB 1660a and a SeNB 1660b. The PeNB 1660a may be similar to the first eNB 160 and the SeNB 1660b may be similar to the second eNB 160 discussed in connection with FIG. 1. An MME 1627 may provide a NAS message 1669a-b (e.g., piggybacked with the RRC messages 1671a-b, for instance). A first user plane protocol stack (e.g., PDCP1 1661a-b, RLC1 1663a-b, MAC1 1665a-b and PHY1 1667a-b) is mapped to the Uu interface 437. A second user plane protocol stack (e.g., PDCP2 1653a-b, RLC2 1655 a-b, MAC2 1657a-b and PHY2 1659a-b) is mapped to the Uux interface 443.

In this configuration, illustrates one example of how to manage RRC messages and parameters 1671 between the PeNB 1660a and the SeNB 1660b. The RRC2 messages and parameters 1677a-b for the Uux interface 443 may be distinguished from the RRC1 messages and parameters 1675 for the Uu interface 437. The X interface 1641a-b may be used to exchange RRC messages and parameters 1677a-b for the SeNB 1660b between the PeNB 1660a and the SeNB 1660b. In this case, the RRC messages and parameters 1677a-b for the SeNB 1660b are called as RRC2.

Figure 17:
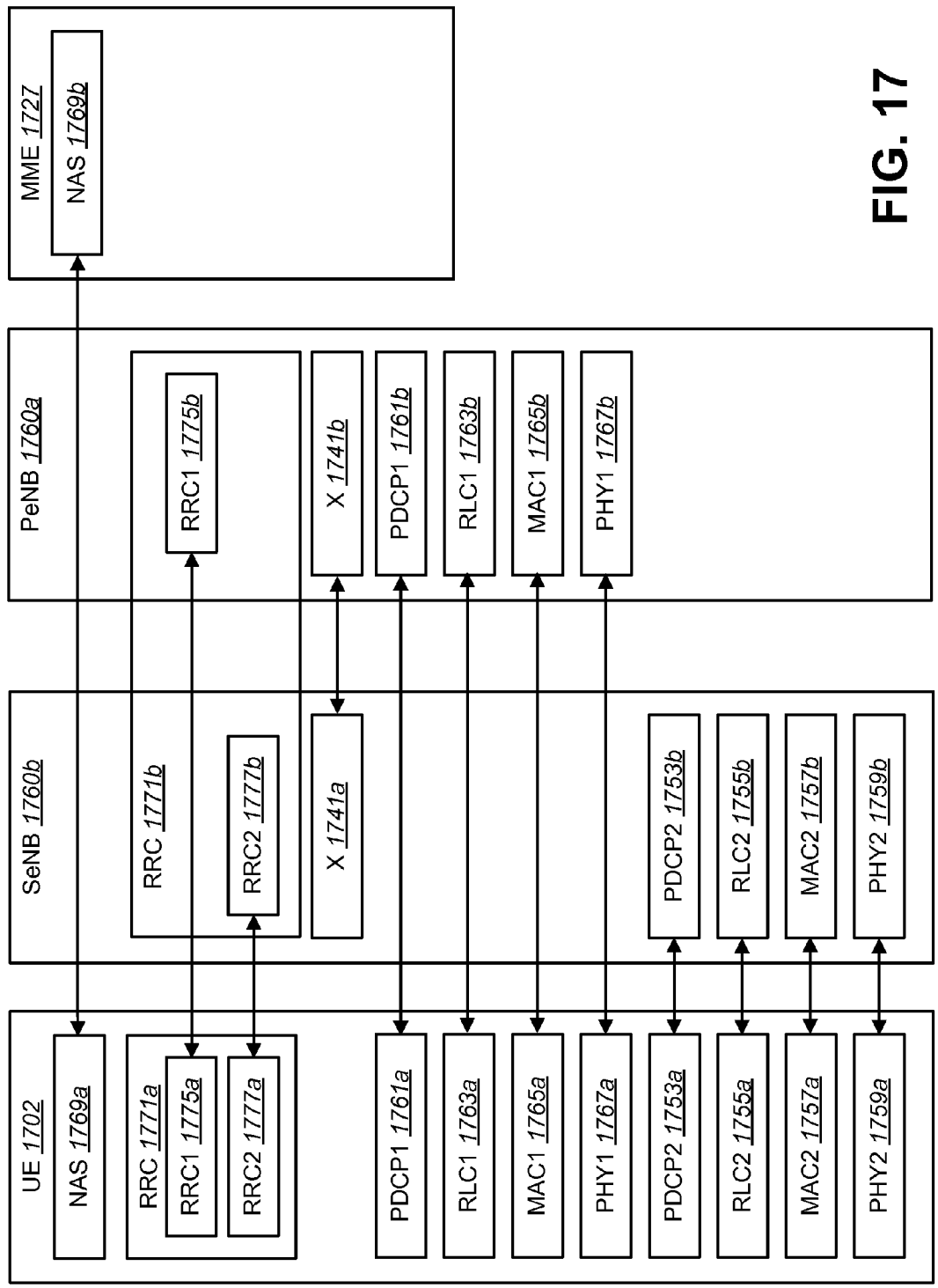
FIG. 17 is a block diagram illustrating a configuration of a control plane protocol stack with multiple control plane terminations.

FIG. 17 is a block diagram illustrating a configuration of a control plane protocol stack with multiple control plane terminations. The UE 1702 described in connection with FIG. 17 may be implemented in accordance with the UE 102 described in connection with FIG. 1. The PeNB 1760a and SeNB 1760b described in connection with FIG. 17 may be implemented in accordance with the eNB 160 described in connection with FIG. 1. In this configuration, a UE 1702 may connect to a PeNB 1760a and a SeNB 1760b. The PeNB 1760a may be similar to the first eNB 160 and the SeNB 1760b may be similar to the second eNB 160 discussed in connection with FIG. 1. An MME 1727 may provide a NAS message 1769a-b (e.g., piggybacked with the RRC messages 1771a-b, for instance). A first user plane protocol stack (e.g., PDCP1 1761a-b, RLC1 1763a-b, MAC1 1765a-b and PHY1 1767a-b) is mapped to the Uu interface 437. A second user plane protocol stack (e.g., PDCP2 1753*a-b*, RLC2 1755*a-b*, MAC2 1757*a-b* and PHY2 1759*a-b*) is mapped to the Uux interface 443.

This configuration illustrates another example of a control plane protocol stack with multiple control plane terminations. For instance, the RRC2 1777*a-b* may be an additional RRC connection (e.g., in addition to RRC1 1775*a-b*). RRC2 1777*a-b* may be a sub-RRC connection in a single RRC connection 1771*a-b*. RRC messages 1775, 1777 may be terminated at multiple points on the E-UTRAN 435. The UE 1702 may send RRC messages 1775, 1777 which are addressed to one of multiple points (e.g., eNBs 1760) on the E-UTRAN 435. The X interface 1741*a-b* may be used to exchange RRC messages and parameters 1771*a-b* between the PeNB 1660*a* and the SeNB 1660*b*.

The addressing of RRC messages 1775, 1777 may be achieved by identifying an SRB to be used for conveying the RRC messages 1775, 1777. The addressing of RRC messages 1775, 1777 may also be achieved by identifying a radio interface (e.g., Uu interface 437 and Uux interface 443) to be used for conveying the RRC messages 1775, 1777. The addressing of RRC messages may further be achieved by identifying a type of the RRC messages 1775, 1777. RRC parameters/messages 1777 for the Uux interface 443 may be distinguished from RRC parameters/messages 1775 for the Uu interface 437. In a configuration where RRC2 1777 is an additional RRC connection 1771, most of existing RRC functions and messages are supported in both RRCs (e.g., RRC1 1775 and RRC2 1777). But some of functions and messages may not be supported in RRC2 1777. In another configuration where RRC2 1777 is sub-RRC connection 1771, limited functions and messages may be supported in RRC2 1777.

Figure 18:
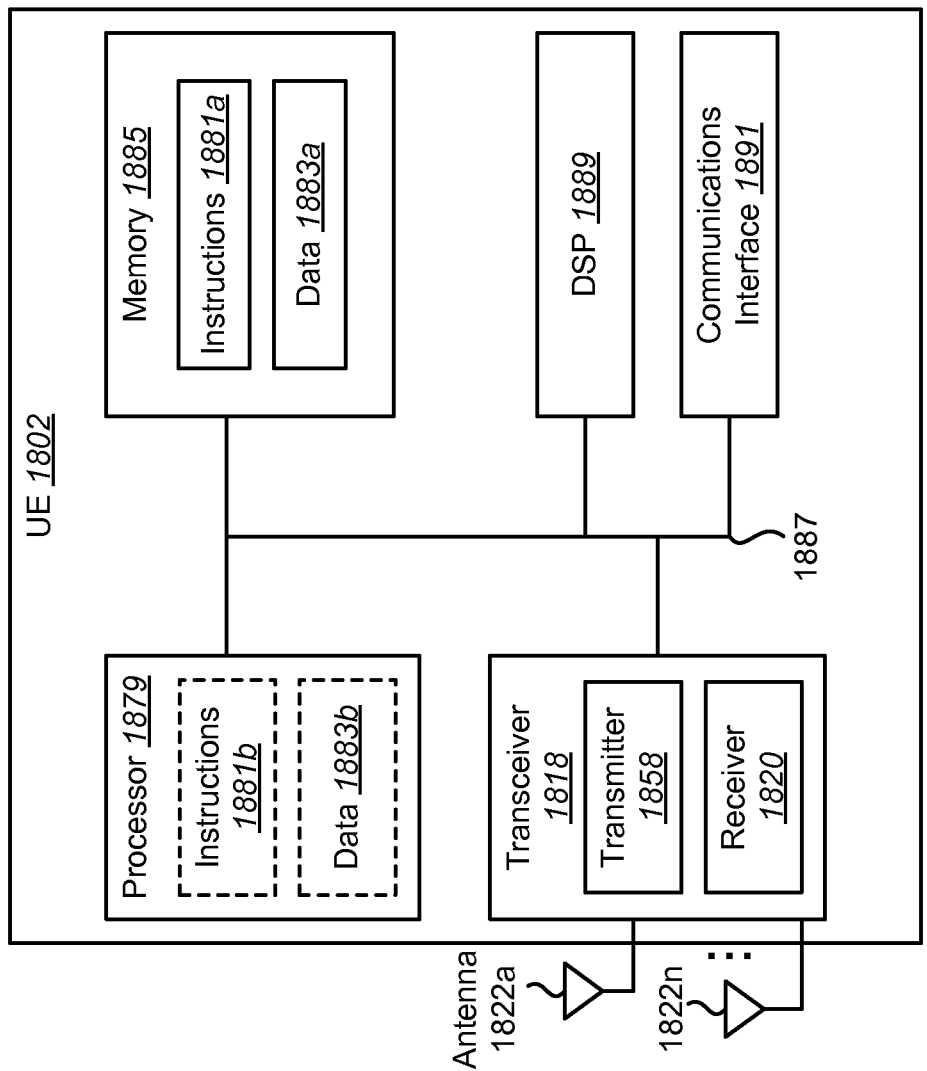
FIG. 18 illustrates various components that may be utilized in a UE.

FIG. 18 illustrates various components that may be utilized in a UE 1802. The UE 1802 described in connection with FIG. 18 may be implemented in accordance with the UE 102 described in connection with FIG. 1. The UE 1802 includes a processor 1879 that controls operation of the UE 1802. The processor 1879 may also be referred to as a central processing unit (CPU). Memory 1885, which may include read-only memory (ROM), random access memory (RAM), a combination of the two or any type of device that may store information, provides instructions 1881*a* and data 1883*a* to the processor 1879. A portion of the memory 1885 may also include non-volatile random access memory (NVRAM). Instructions 1881*b* and data 1883*b* may also reside in the processor 1879. Instructions 1881*b* and/or data 1883*b* loaded into the processor 1879 may also include instructions 1881*a* and/or data 1883*a* from memory 1885 that were loaded for execution or processing by the processor 1879. The instructions 1881*b* may be executed by the processor 1879 to implement one or more of the methods 200 described above.

The UE 1802 may also include a housing that contains one or more transmitters 1858 and one or more receivers 1820 to allow transmission and reception of data. The transmitter(s) 1858 and receiver(s) 1820 may be combined into one or more transceivers 1818. One or more antennas 1822*a-n* are attached to the housing and electrically coupled to the transceiver 1818.

The various components of the UE 1802 are coupled together by a bus system 1887, which may include a power bus, a control signal bus and a status signal bus, in addition to a data bus. However, for the sake of clarity, the various buses are illustrated in FIG. 18 as the bus system 1887. The UE 1802 may also include a digital signal processor (DSP) 1889 for use in processing signals. The UE 1802 may also include a communications interface 1891 that provides user access to the functions of the UE 1802. The UE 1802 illustrated in FIG. 18 is a functional block diagram rather than a listing of specific components.

Figure 19:
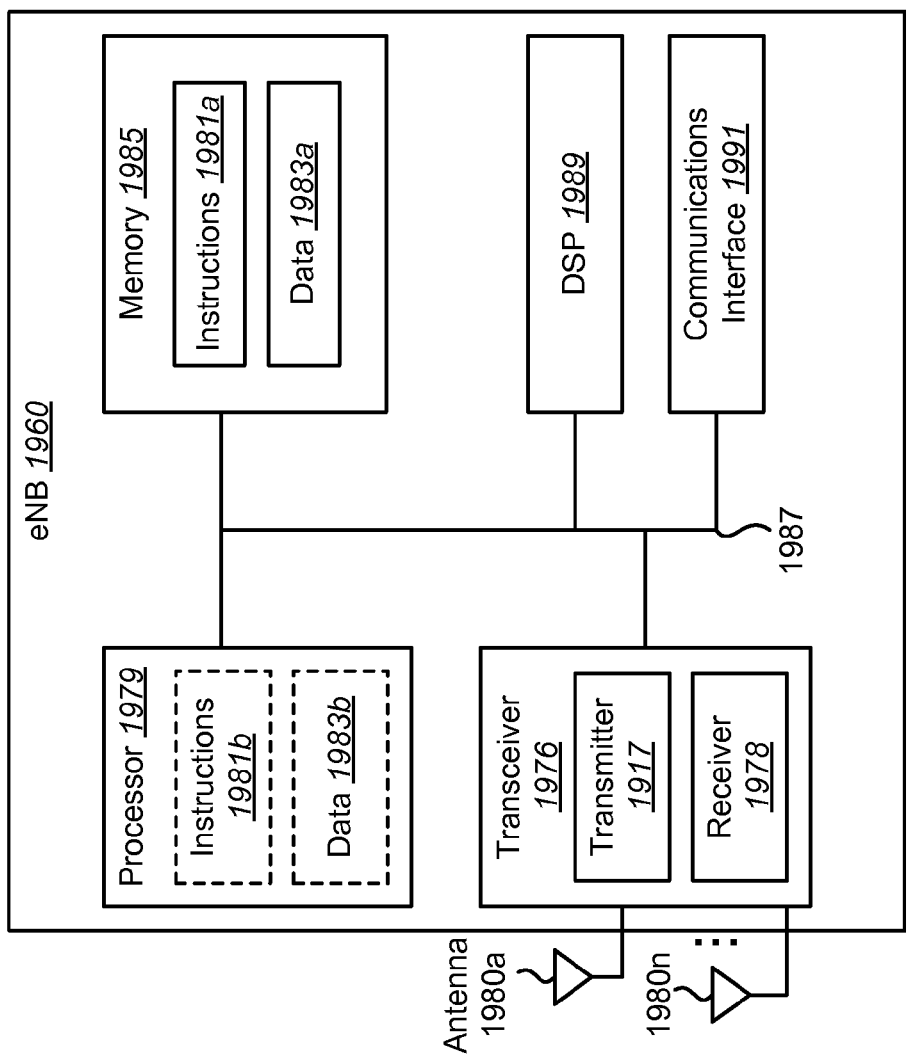
FIG. 19 illustrates various components that may be utilized in an eNB.

FIG. 19 illustrates various components that may be utilized in an eNB 1960. The eNB 1960 described in connection with FIG. 19 may be implemented in accordance with the eNB 160 described in connection with FIG. 1. The eNB 1960 includes a processor 1979 that controls operation of the eNB 1960. The processor 1979 may also be referred to as a central processing unit (CPU). Memory 1985, which may include read-only memory (ROM), random access memory (RAM), a combination of the two or any type of device that may store information, provides instructions 1981*a* and data 1983*a* to the processor 1979. A portion of the memory 1985 may also include non-volatile random access memory (NVRAM). Instructions 1981*b* and data 1983*b* may also reside in the processor 1979. Instructions 1981*b* and/or data 1983*b* loaded into the processor 1979 may also include instructions 1981*a* and/or data 1983*a* from memory 1985 that were loaded for execution or processing by the processor 1979. The instructions 1981*b* may be executed by the processor 1979 to implement one or more of the methods 300 described above.

The eNB 1960 may also include a housing that contains one or more transmitters 1917 and one or more receivers 1978 to allow transmission and reception of data. The transmitter(s) 1917 and receiver(s) 1978 may be combined into one or more transceivers 1976. One or more antennas 1980*a-n* are attached to the housing and electrically coupled to the transceiver 1976.

The various components of the eNB 1960 are coupled together by a bus system 1987, which may include a power bus, a control signal bus and a status signal bus, in addition to a data bus. However, for the sake of clarity, the various buses are illustrated in FIG. 19 as the bus system 1987. The eNB 1960 may also include a digital signal processor (DSP) 1989 for use in processing signals. The eNB 1960 may also include a communications interface 1991 that provides user access to the functions of the eNB 1960. The eNB 1960 illustrated in FIG. 19 is a functional block diagram rather than a listing of specific components.

Figure 20:
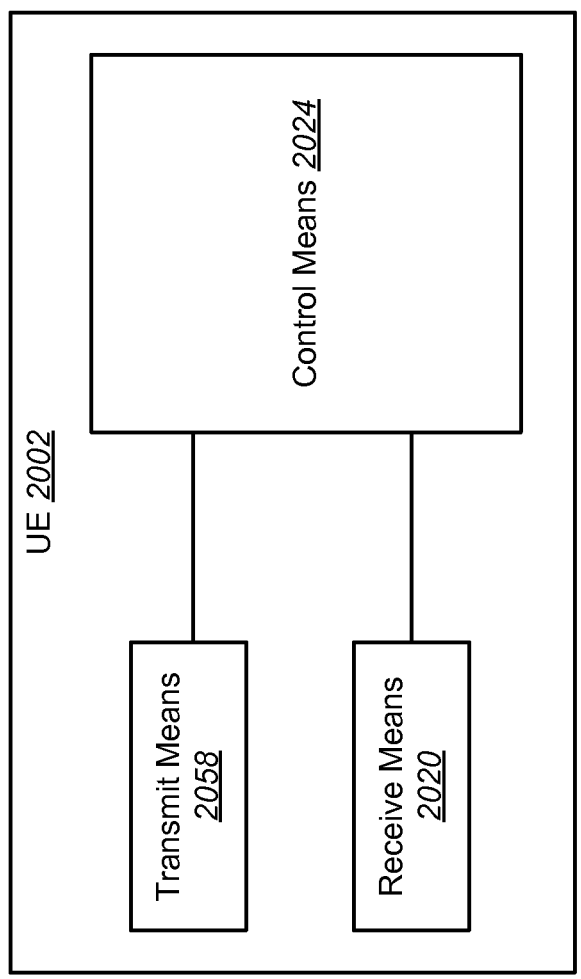
FIG. 20 is a block diagram illustrating one configuration of a UE in which systems and methods for sending feedback information may be implemented.

FIG. 20 is a block diagram illustrating one configuration of a UE 2002 in which systems and methods for sending feedback information may be implemented. The UE 2002 includes transmit means 2058, receive means 2020 and control means 2024. The transmit means 2058, receive means 2020 and control means 2024 may be configured to perform one or more of the functions described in connection with FIG. 2 above. FIG. 18 above illustrates one example of a concrete apparatus structure of FIG. 20. Other various structures may be implemented to realize one or more of the functions of FIG. 2. For example, a DSP may be realized by software.

Figure 21:
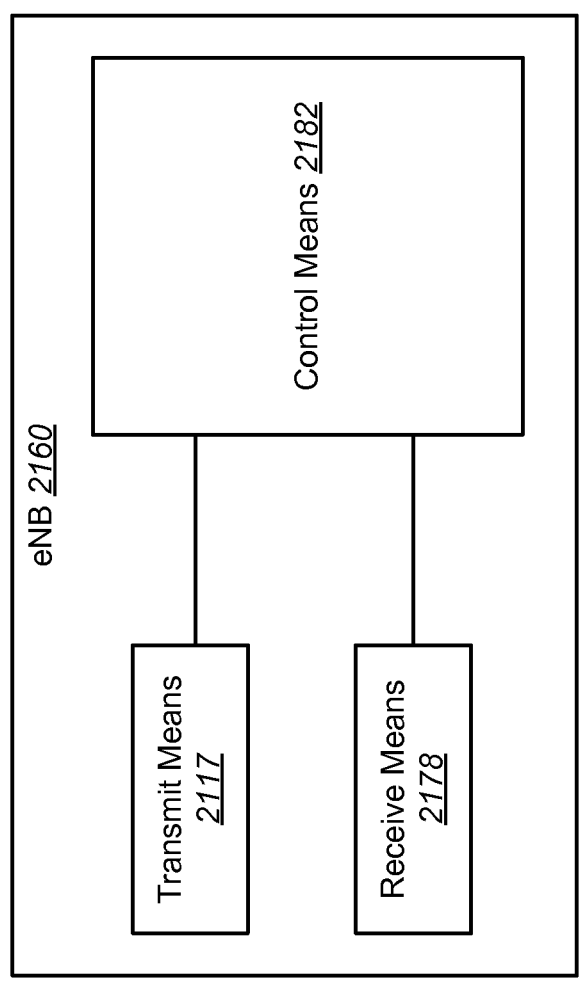
FIG. 21 is a block diagram illustrating one configuration of an eNB in which systems and methods for receiving feedback information may be implemented.

FIG. 21 is a block diagram illustrating one configuration of an eNB 2160 in which systems and methods for receiving feedback information may be implemented. The eNB 2160 includes transmit means 2117, receive means 2178 and control means 2182. The transmit means 2117, receive means 2178 and control means 2182 may be configured to perform one or more of the functions described in connection with FIG. 3 above. FIG. 19 above illustrates one example of a concrete apparatus structure of FIG. 21. Other various structures may be implemented to realize one or more of the functions of FIG. 3. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method performed by a primary evolved NodeB (PeNB), comprising:
   communicating with a secondary evolved NodeB (SeNB) via an X2 interface for inter-eNB control plane signaling for dual connectivity, wherein the control plane signaling towards a Mobility Management Entity (MME) is performed by means of S1 interface signaling, S1-U interface only terminates in the PeNB and user plane data is transferred from the PeNB to SeNB using the X2 interface,
   S1-MME interface terminates in the PeNB,
   the PeNB and the SeNB are interconnected via an X2-C interface for dual connectivity,
   the X2-C interface is used to exchange RRC messages and parameters for the SeNB between the PeNB and the SeNB, and
   Signaling Radio Bearers (SRBs) are configured for only the PeNB.

2. A method performed by a secondary evolved NodeB (SeNB), comprising:
   communicating with a primary evolved NodeB (PeNB) via an X2 interface for inter-eNB control plane signaling for dual connectivity, wherein the control plane signaling towards a Mobility Management Entity (MME) is performed by means of S1 interface signaling, S1-U interface only terminates in the PeNB and user plane data is transferred from the PeNB to SeNB using the X2 interface,
   S1-MME interface terminates in the PeNB,
   the PeNB and the SeNB are interconnected via an X2-C interface for dual connectivity,
   the X2-C interface is used to exchange RRC messages and parameters for the SeNB between the PeNB and the SeNB, and
   Signaling Radio Bearers (SRBs) are configured for only the PeNB.

3. A primary evolved NodeB (PeNB), comprising:
   a processor; and
   memory in electronic communication with the processor, wherein instructions stored in the memory are executable to:
   communicate with a secondary evolved NodeB (SeNB) via an X2 interface for inter-eNB control plane signaling for dual connectivity, wherein the control plane signaling towards a Mobility Management Entity (MME) is performed by means of S1 interface signaling, S1-U interface only terminates in the PeNB and user plane data is transferred from the PeNB to SeNB using the X2 interface,
   S1-MME interface terminates in the PeNB,
   the PeNB and the SeNB are interconnected via an X2-C interface for dual connectivity,
   the X2-C interface is used to exchange RRC messages and parameters for the SeNB between the PeNB and the SeNB, and
   Signaling Radio Bearers (SRBs) are configured for only the PeNB.

4. A secondary evolved NodeB (SeNB), comprising:
   a processor; and
   memory in electronic communication with the processor, wherein instructions stored in the memory are executable to:
   communicate with a primary evolved NodeB (PeNB) via an X2 interface for inter-eNB control plane signaling for dual connectivity, wherein the control plane signaling towards a Mobility Management Entity (MME) is performed by means of S1 interface signaling, S1-U interface only terminates in the PeNB and user plane data is transferred from the PeNB to SeNB using the X2 interface,
   S1-MME interface terminates in the PeNB,
   the PeNB and the SeNB are interconnected via an X2-C interface for dual connectivity,
   the X2-C interface is used to exchange RRC messages and parameters for the SeNB between the PeNB and the SeNB, and
   Signaling Radio Bearers (SRBs) are configured for only the PeNB.

* * * * *